(12) United States Patent
Lo et al.

(10) Patent No.: US 9,561,719 B2
(45) Date of Patent: Feb. 7, 2017

(54) APPARATUS AND METHOD FOR DELIVERING POWER IN A HYBRID VEHICLE

(71) Applicant: GE Hybrid Technologies, LLC, Albany, NY (US)

(72) Inventors: Jonathan Mong Ling Lo, Burnaby (CA); Jacek Gromadzki, Vancouver (CA); Nicolas Louis Bouchon, Burnaby (CA); Martin Alexander Strange, Vancouver (CA); Victor Woo, Richmond (CA)

(73) Assignee: GE HYBRID TECHNOLOGIES, LLC, Albany, NY (US)

(*) Notice: Subject to any disclaimer, the term of this patent is extended or adjusted under 35 U.S.C. 154(b) by 0 days.

(21) Appl. No.: 14/375,396

(22) PCT Filed: Feb. 1, 2013

(86) PCT No.: PCT/CA2013/000092
§ 371 (c)(1),
(2) Date: Jul. 29, 2014

(87) PCT Pub. No.: WO2013/113103
PCT Pub. Date: Aug. 8, 2013

(65) Prior Publication Data
US 2015/0008057 A1    Jan. 8, 2015

Related U.S. Application Data

(60) Provisional application No. 61/633,048, filed on Feb. 3, 2012.

(51) Int. Cl.
*B60W 10/06*    (2006.01)
*B60K 17/28*    (2006.01)
(Continued)

(52) U.S. Cl.
CPC ............... *B60K 17/28* (2013.01); *B60K 6/26* (2013.01); *B60K 6/365* (2013.01); *B60K 6/383* (2013.01);
(Continued)

(58) Field of Classification Search
CPC .... B60W 10/02; B60W 10/023; B60W 10/08; B60K 2006/268
(Continued)

(56) References Cited

U.S. PATENT DOCUMENTS 5,856,709 A * 1/1999 Ibaraki ................. B60K 6/36
                                                     180/165
5,991,683 A * 11/1999 Takaoka ................ B60K 6/40
                                                     180/65.235
(Continued)

FOREIGN PATENT DOCUMENTS

CN    1281799 A        1/2001
JP    2011-079500      4/2011
(Continued)

OTHER PUBLICATIONS

PCT International Search Report; Application No. PCT/CA2013/000092; Apr. 11, 2013; 4 pages.
(Continued)

*Primary Examiner* — Jeffrey J Restifo
(74) *Attorney, Agent, or Firm* — Meagher Emanuel Laks Goldberg & Liao, LLP

(57) ABSTRACT

A method and apparatus for delivering power to a hybrid vehicle is disclosed. The apparatus includes an apparatus for delivering power to a hybrid vehicle, the hybrid vehicle including a powertrain having a power take-off coupling, the powertrain including an engine and a transmission. The apparatus includes an electric motor operable to generate a torque, the motor being coupled to transmit a starting torque
(Continued)

through the power take-off of the powertrain for starting the engine.

34 Claims, 8 Drawing Sheets

(51) Int. Cl.
*B60L 11/14* (2006.01)
*B60K 6/365* (2007.10)
*B60K 6/383* (2007.10)
*B60K 6/48* (2007.10)
*B60W 30/188* (2012.01)
*B60L 11/12* (2006.01)
*B60K 6/26* (2007.10)
*B60K 6/387* (2007.10)
*B60K 17/344* (2006.01)

(52) U.S. Cl.
CPC ............... *B60K 6/387* (2013.01); *B60K 6/48* (2013.01); *B60L 11/12* (2013.01); *B60L 11/14* (2013.01); *B60W 30/1888* (2013.01); *B60K 17/344* (2013.01); *B60K 2006/268* (2013.01); *Y02T 10/6221* (2013.01); *Y02T 10/6265* (2013.01); *Y02T 10/7077* (2013.01); *Y10S 903/915* (2013.01)

(58) Field of Classification Search
USPC .............. 180/65.25, 65.265, 65.285, 65.28
See application file for complete search history.

(56) References Cited

U.S. PATENT DOCUMENTS

| | | | | |
|---|---|---|---|---|
| 6,018,198 A * | 1/2000 | Tsuzuki | ............. | B60K 6/365 180/65.25 |
| 6,077,186 A * | 6/2000 | Kojima | ............. | B60K 6/48 180/65.25 |
| 6,090,005 A * | 7/2000 | Schmidt | ............. | B60K 6/365 475/2 |
| 6,258,006 B1 * | 7/2001 | Hanyu | ............. | B60K 6/387 475/5 |
| 6,302,227 B1 * | 10/2001 | Takemura | ............. | B60K 6/40 180/65.25 |
| 6,592,484 B1 * | 7/2003 | Tsai | ............. | B60K 6/365 475/5 |
| 7,256,510 B2 * | 8/2007 | Holmes | ............. | B60K 6/365 180/65.1 |
| 7,314,422 B2 * | 1/2008 | Hwang | ............. | B60K 6/365 475/5 |
| 7,555,374 B2 * | 6/2009 | Wu | ............. | B60K 6/40 180/65.8 |
| 7,618,343 B2 * | 11/2009 | Tabata | ............. | B60K 6/445 475/219 |
| 7,650,956 B2 * | 1/2010 | Hirata | ............. | B60K 6/445 180/248 |
| 7,694,762 B2 * | 4/2010 | Supina | ............. | B60K 6/365 180/65.25 |
| 7,753,816 B2 * | 7/2010 | Chachra | ............. | B60K 6/365 180/65.235 |
| 7,771,309 B2 * | 8/2010 | Kamada | ............. | B60K 6/442 477/3 |
| 7,780,562 B2 * | 8/2010 | King | ............. | B60K 6/26 475/5 |
| 7,846,051 B2 * | 12/2010 | Holmes | ............. | B60K 6/387 475/5 |
| 7,927,244 B2 * | 4/2011 | Iwanaka | ............. | B60K 6/40 475/275 |
| 7,959,535 B2 * | 6/2011 | Matsubara | ............. | B60K 6/445 180/65.28 |
| 7,987,934 B2 * | 8/2011 | Huseman | ............. | B60K 6/445 180/65.21 |
| 7,992,661 B2 * | 8/2011 | Nomura | ............. | B60K 6/405 180/65.21 |
| 7,998,016 B2 * | 8/2011 | Si | ............. | B60K 6/365 475/284 |
| 7,998,021 B2 * | 8/2011 | Matsubara | ............. | B60K 6/40 477/3 |
| 8,192,324 B2 * | 6/2012 | Kraska | ............. | B60K 6/48 477/5 |
| 8,292,012 B2 * | 10/2012 | Sowul | ............. | B60K 6/365 180/65.265 |
| 8,317,646 B2 * | 11/2012 | Si | ............. | B60K 6/48 475/286 |
| 8,474,556 B2 * | 7/2013 | Wang | ............. | B60K 6/40 180/65.22 |
| 8,491,431 B2 * | 7/2013 | Si | ............. | B60K 6/365 475/284 |
| 8,565,990 B2 * | 10/2013 | Ortmann | ............. | B60K 6/48 701/1 |
| 8,882,624 B1 * | 11/2014 | Huh | ............. | B60K 6/365 475/151 |
| 8,894,528 B2 * | 11/2014 | Venturi | ............. | B60K 6/365 475/8 |
| 8,911,315 B2 * | 12/2014 | Kaltenbach | ............. | B60K 6/365 475/4 |
| 9,090,256 B2 * | 7/2015 | Takahashi | ............. | B60W 10/184 |
| 9,145,136 B2 * | 9/2015 | Suntharalingam | ..... | B60K 6/365 |
| 2002/0065168 A1 * | 5/2002 | Kima | ............. | B60K 6/365 477/107 |
| 2010/0057281 A1 * | 3/2010 | Lawyer | ............. | G07C 5/0825 701/22 |
| 2011/0086739 A1 | 4/2011 | Kajigai et al. | | |
| 2011/0202234 A1 * | 8/2011 | Bradley | ............. | B60K 6/48 701/36 |
| 2012/0245781 A1 * | 9/2012 | Kanamori | ............. | B60K 6/48 701/22 |
| 2013/0296127 A1 * | 11/2013 | Shelton | ............. | B60W 20/10 477/5 |
| 2013/0297125 A1 * | 11/2013 | Syed | ............. | B60W 20/40 701/22 |
| 2013/0297135 A1 * | 11/2013 | Yamanaka | ............. | B60K 6/48 701/22 |
| 2013/0297136 A1 * | 11/2013 | Yamanaka | ............. | B60K 6/48 701/22 |
| 2014/0129069 A1 * | 5/2014 | Nimi | ............. | B60K 6/445 701/22 |
| 2014/0338642 A1 * | 11/2014 | Kamijo | ............. | B60K 6/445 123/491 |
| 2014/0365054 A1 * | 12/2014 | Yamamoto | ............. | F02D 41/065 701/22 |
| 2015/0008057 A1 * | 1/2015 | Lo | ............. | B60L 11/12 180/165 |
| 2016/0052382 A1 * | 2/2016 | Clark | ............. | B60K 6/26 477/5 |

FOREIGN PATENT DOCUMENTS

| | | |
|---|---|---|
| WO | 2009049066 A2 | 4/2009 |
| WO | 2010065476 A2 | 6/2010 |
| WO | 2011056276 A1 | 5/2011 |

OTHER PUBLICATIONS

PCT Written Opinion of the International Searching Authority; Application No. PCT/CA2013/000092; Apr. 11, 2013; 5 pages.
Unofficial English Translation of Chinese Office Action issued in connection with corresponding CN Application No. 201380016488.0 on May 26, 2016.
English Translation of Office Action for corresponding Japanese Application No. 2014-555046 dated Aug. 23, 2016.

\* cited by examiner

APPARATUS AND METHOD FOR DELIVERING POWER IN A HYBRID VEHICLE

CROSS REFERENCE

This application is a filing under 35 U.S.C. 371 of International Application No. PCT/CA2013/000092 filed Feb. 1, 2013, entitled "Apparatus and Method for Delivering Power in a Hybrid Vehicle" claiming priority to U.S. Provisional Application No. 61/633,048 filed on Feb. 3, 2012, entitled "Apparatus and Method for Delivering Power in a Hybrid Vehicle", which are incorporated by reference herein as if reproduced in their entirety.

BACKGROUND OF THE INVENTION

1. Field of Invention

This invention relates generally to hybrid vehicles and more particularly to an apparatus for delivering power to a hybrid vehicle including a powertrain having a power take-off (PTO) coupling.

2. Description of Related Art

Hybrid vehicles having both an internal combustion engine and an electric motor for supplying operating power to the vehicle generally provide greater operating efficiency than conventional vehicles in which the operating power is supplied by an engine alone. However, there is significant cost and complexity associated with incorporating hybrid drive components in existing vehicles and substantial redesign of the vehicle is commonly required. Accordingly, there remains a need for methods and apparatus for implementing hybrid functionality in vehicles.

SUMMARY OF THE INVENTION

In accordance with a particular embodiment, there is provided an apparatus for delivering power to a hybrid vehicle, the hybrid vehicle including a powertrain including an engine and having a power take-off. The apparatus includes an electric motor operable to generate a torque, the motor being coupled to transmit a starting torque through the power take-off of the powertrain for starting the engine.

The powertrain may further include a transmission and the power take-off may couple the starting torque to one of the engine and the transmission.

The powertrain may further include a transmission and the transmission may include a torque converter having an input coupled to receive torque generated by the engine from an engine output shaft, and the power take-off may be coupled to transmit the starting torque to the engine output shaft.

The powertrain may further include a transmission and the transmission may include a torque converter having an input coupled to receive torque generated by the engine from an engine output shaft, the torque converter being operable to transmit the torque by fluid coupling to an output, and the power take-off may be coupled to transmit the starting torque to the output of the torque converter, the torque converter further including a lock-up clutch for mechanically coupling the input of the torque converter to the output of the torque converter for transmitting the starting torque through the torque converter to the engine.

The lock-up clutch may be actuated by hydraulic fluid pressure provided by a fluid pump operated using engine power and may further include one of a hydraulic accumulator operably configured to provide hydraulic fluid pressure for actuating the lock-up clutch prior to starting the engine, and an electrically powered hydraulic pump operably configured to provide hydraulic fluid pressure for actuating the lock-up clutch prior to starting the engine.

The power take-off may include a power take-off clutch operable when engaged to transmit the engine starting torque through the power take-off to the engine.

The power take-off clutch may be actuated by hydraulic fluid pressure provided by a fluid pump, and the apparatus may further include one of a hydraulic accumulator operably configured to provide hydraulic fluid pressure for actuating the power take-off clutch prior to starting the engine, and an electrically powered hydraulic pump operably configured to provide hydraulic fluid pressure for actuating the power take-off clutch prior to starting the engine.

The power take-off clutch may include one of an electrically actuated clutch, and a mechanically actuated clutch and power for actuation of the clutch may be provided from a power source other than the engine.

The apparatus may include a planetary gear system operable to receive torque generated by the motor and being selectively configurable to transmit the starting torque through the power take-off coupling to the engine.

The apparatus may include a clutch disposed to selectively transmit torque between the engine and the driveline of the vehicle, the clutch being operable to transmit an engine drive torque to the driveline when engaged and operable to disengage the engine from the driveline while the engine may be being started.

The clutch may include an overrunning clutch operable to disengage the driveline from the engine when a rotational speed of the driveline may be greater than a rotational speed of the engine.

The powertrain may further include a transmission including a planetary gear set and the overrunning clutch may include an overrunning clutch disposed within the transmission and coupled between the planetary gear set and the driveline.

The planetary gear system may include a sun gear, a ring gear, a planet gear coupled between the sun gear and the ring gear, and a planet carrier coupled to the planet gear and the motor may be coupled to the sun gear, one of the ring gear and the planet carrier being coupled to the power take-off coupling of the engine, and the other of the ring gear and the planet carrier being coupled to the driveline, and the planetary gear system may be configurable to transmit the starting torque to the engine by configuring the planetary gear system to transmit the engine starting torque to the engine through one of the ring gear and the planet carrier while prohibiting rotation of the other of the ring gear and the planet carrier.

The apparatus may include a brake operable to be actuated to prohibit rotation of the other of the ring gear and the planet carrier.

The clutch may include a three-way clutch having a disengaged state, an engaged state for transmitting torque between the engine and the driveline, and a braked state in which a brake is actuated to prohibit rotation of the driveline.

The powertrain may further includes a transmission including a transmission lock-up operable to prohibit rotation of an output shaft of the transmission the transmission lock-up being operably configured to be engaged to prohibit rotation of the other of the ring gear and the planet carrier.

The ring gear may be coupled to the power take-off coupling of the engine and the planet carrier may be coupled to the driveline and may further include a ring gear brake operable to prohibit rotation of the ring gear.

The planetary gear system may be selectively configurable to receive torque from the driveline and to transmit a generating torque through the planetary gear system to the motor to facilitate generation of electrical power by the motor when the motor is configured to act as a generator.

The generating torque may include at least one of a torque generated by the engine, and a regenerative torque coupled through wheels of the vehicle to the driveline.

The planetary gear system may include a sun gear, a ring gear, a planet gear coupled between the sun gear and the ring gear, and a planet carrier coupled to the planet gear, and the motor may be coupled to the sun gear, one of the ring gear and the planet carrier being coupled to driveline, the planetary gear system being configurable to transmit the generating torque by prohibiting rotation of the other of the ring gear and the planet carrier to cause the generating torque to be transmitted from the driveline through the sun gear to the motor.

The planetary gear system may be selectively configurable to transmit a portion of the torque generated by the motor to the driveline as a motor drive torque.

The planetary gear system may be selectively configurable to transmit the motor drive torque to the driveline while simultaneously transmitting the starting torque through the power take-off coupling to the engine for starting the engine.

The planetary gear system may include a sun gear, a ring gear, a planet gear coupled between the sun gear and the ring gear, and a planet carrier coupled to the planet gear, and the motor may be coupled to the sun gear, one of the ring gear and the planet carrier being coupled to the power take-off coupling of the engine, and the other of the ring gear and the planet carrier being coupled to the driveline, the planetary gear system being configurable to permit rotation of both the ring gear and the planet carrier for simultaneously transmitting the starting torque through the power take-off coupling to the engine and the motor drive torque to the driveline.

The apparatus may include an auxiliary power output for delivering power for operating auxiliary equipment and the planetary gear system may be selectively configurable to receive torque generated by the motor and transmit the torque to the auxiliary power output.

The planetary gear system may include a sun gear, a ring gear, a planet gear coupled between the sun gear and the ring gear, and a planet carrier coupled to the planet gear, and the motor may be coupled to the sun gear, one of the ring gear and the planet carrier being coupled to the auxiliary power output, the planetary gear system being selectively configurable to transmit the torque received from the motor to the auxiliary power output by configuring the planetary gear system to transmit torque through the one of the ring gear and the planet carrier coupled to the auxiliary power output while prohibiting rotation of the other of the ring gear and the planet carrier.

The apparatus may include an auxiliary power output for delivering power for operating auxiliary equipment, and the power take-off coupling of the engine may be operable to be selectively coupled to transmit torque to the auxiliary power output once the engine has started.

The planetary gear system may be configurable to receive torque generated by the engine from the power take-off coupling of the engine and to transmit at least a portion of the torque through the planetary gear system to the motor for generating electrical power when the motor is configured to operate as a generator.

The planetary gear system may include a sun gear, a ring gear, a planet gear coupled between the sun gear and the ring gear, and a planet carrier coupled to the planet gear, the motor being coupled to the sun gear, and one of the ring gear and the planet carrier being coupled to receive the torque generated by the engine from the power take-off coupling of the engine, the planetary gear system being selectively configurable to transmit the torque from the one of the ring gear and the planet carrier through the sun gear to the motor by prohibiting rotation of the other of the ring gear and the planet carrier.

In accordance with another embodiment there is provided a method for delivering power to a hybrid vehicle, the hybrid vehicle including a powertrain having a power take-off, the powertrain including an engine and a transmission. The method involves causing an electric motor to generate a torque and coupling the motor to transmit a starting torque through the power take-off of the powertrain for starting the engine.

In accordance with another embodiment there is provided a method for delivering power in a hybrid vehicle, the hybrid vehicle including a powertrain including an engine and having a power take-off. The method involves causing an electric motor to generate a torque, and coupling at least a portion of the torque through the power take-off of the powertrain for starting the engine.

The powertrain further may include a transmission and coupling may involve coupling the portion of the torque to one of the engine and the transmission.

Coupling the portion of the torque through the power take-off may involve engaging a power take-off clutch operable to transmit the engine starting torque through the power take-off to the engine.

The power take-off clutch may be actuated by hydraulic fluid pressure provided by a fluid pump, and the method may further involve one of accumulating a hydraulic fluid pressure for actuating the power take-off clutch prior to starting the engine, and actuating an electrically powered hydraulic pump operably configured to provide hydraulic fluid pressure for actuating the power take-off clutch prior to starting the engine.

The method may involve receiving a torque from a driveline of the vehicle and transmitting a generating torque to the motor to facilitate generation of electrical power by the motor when the motor is configured to act as a generator.

Transmitting the generating torque may involve transmitting at least one of a torque generated by the engine, and a regenerative torque coupled through wheels of the vehicle to the driveline.

The method may involve receiving torque generated by the motor and transmitting the torque to the auxiliary power output for delivering power for operating auxiliary equipment.

In accordance with another aspect of the invention there is provided an apparatus for delivering power in a hybrid vehicle, the hybrid vehicle including a driveline and a powertrain, the powertrain including an engine and having a power take-off. The apparatus includes an electric motor. The apparatus also includes a gearbox selectively configurable for at least one of coupling a starting torque generated by the motor through the power take-off of the powertrain for starting the engine, and transmitting a drive torque generated by the motor to the driveline for driving the vehicle.

The gearbox may be further selectively configurable to receive a torque from the driveline and to transmit a generating torque to the motor to facilitate generation of electrical power by the motor when the motor is configured to act as a generator.

The gearbox may be further selectively configurable to receive torque generated by the motor and to transmit the torque to the auxiliary power output for delivering power for operating auxiliary equipment.

In accordance with another aspect of the invention there is provided a hybrid vehicle apparatus. The apparatus includes a powertrain including an engine and having a power take-off, the powertrain being operable to generate a torque at an output shaft of the powertrain. The apparatus also includes a driveline having a driveline shaft operable to transmit drive power to wheels of the vehicle. The apparatus further includes at least one clutch for coupling torque between the output of the powertrain and the driveline shaft, and an electric motor operable to generate a torque. The motor is operable to be coupled to transmit a starting torque through the power take-off of the powertrain for starting the engine.

The powertrain may include a transmission coupled between the engine and the output shaft of the powertrain and the power take-off may be coupled to transmit the starting torque to the engine through the transmission.

In accordance with another aspect of the invention there is provided an apparatus for coupling an engine starting torque to a power-take off of a vehicle powertrain, the power take off having a power take-off clutch selectively operable to couple power through the power take off. The apparatus includes an electric motor operable to generate a starting torque, and an actuator operable to cause the power take-off clutch to be engaged to transmit the starting torque through the power take-off to the engine.

The clutch may be actuated by hydraulic fluid pressure and may further include one of a hydraulic accumulator operably configured to provide hydraulic fluid pressure for actuating the clutch prior to starting the engine, and an electrically powered hydraulic pump operably configured to provide hydraulic fluid pressure for actuating the clutch prior to starting the engine.

The electric motor may be further operable to transmit a portion of the torque generated by the motor to the driveline as a motor drive torque.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
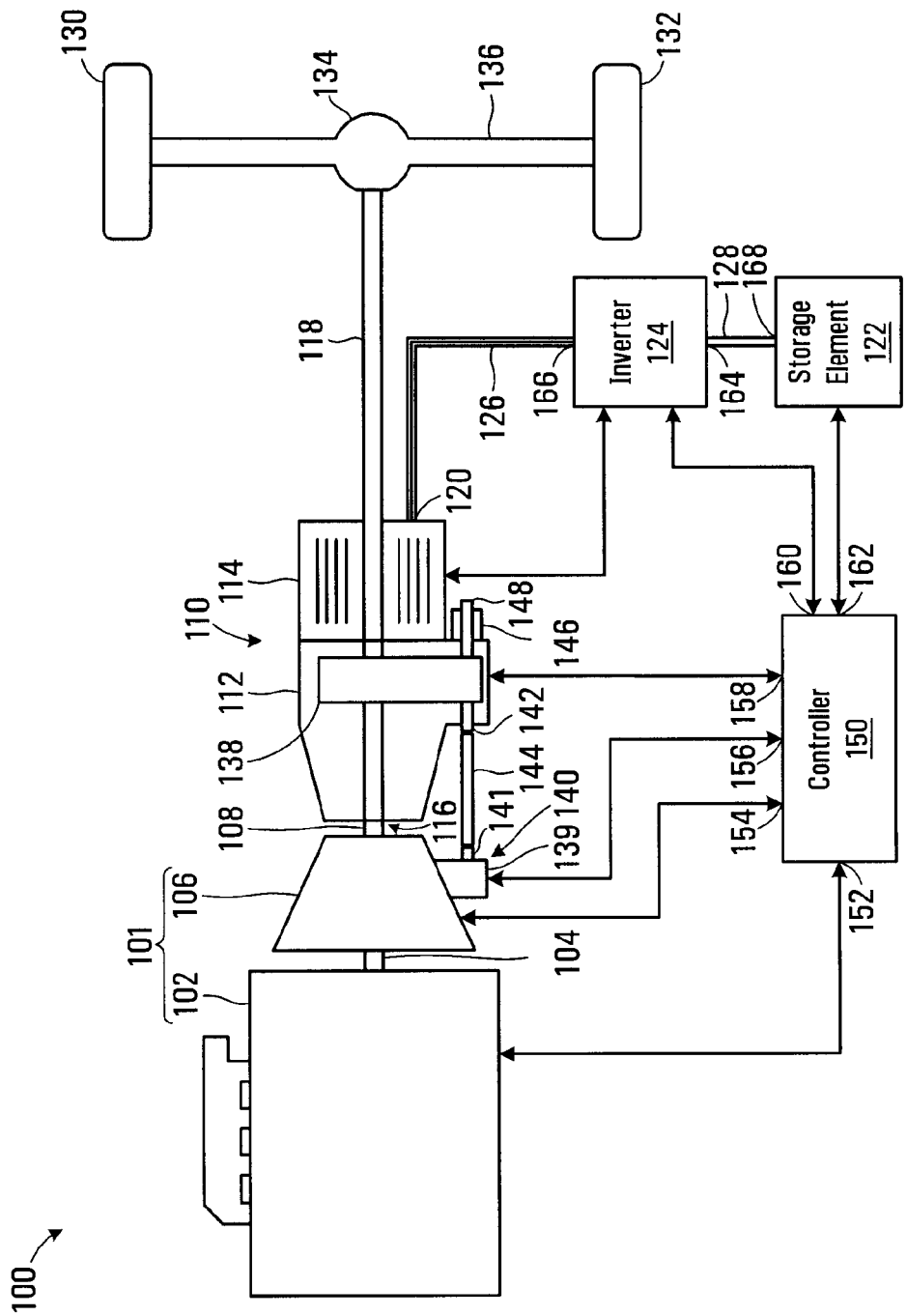
FIG. 1 is a schematic view of a hybrid vehicle including a gearbox and motor apparatus according to a first embodiment of the invention.

Referring to FIG. 1, a hybrid vehicle is shown schematically at 100. The hybrid vehicle 100 includes a powertrain 101, including an engine 102, such as an internal combustion engine capable of producing torque at an engine output shaft 104. The powertrain 101 also includes a transmission 106 coupled to the engine output shaft 104. The transmission 106 includes a transmission output shaft 108 and further includes gearing (not shown in FIG. 1) that is operable to convert the output speed and torque produced by the engine 102 at the engine output shaft 104 into suitable speed and torque ranges at the transmission output shaft 108 for providing power for operating the vehicle 100. The transmission 106 may be implemented as a manual or an automatic transmission.

The vehicle 100 further includes an apparatus 110 according to a first embodiment, which includes a gearbox 112 and an electric motor 114. The gearbox 112 has an input 116 for receiving torque generated by the engine 102 and transmitted through the transmission to the transmission output shaft 108. The gearbox 112 is also coupled to a driveline, which in this embodiment includes a driveline shaft 118.

The motor 114 includes an electrical input 120 for receiving electrical power for operating the motor to generate torque. In this embodiment, the motor 114 is an alternating current (AC) motor and AC electrical power is received at the input 120. The vehicle 100 also includes a DC-AC inverter 124 having an input 164 for receiving direct current (DC) power and an output 166 for producing AC power. The output 166 is connected via an AC power bus 126 to the input 120 of the motor 114. Electrical power for operating the motor is provided by an energy storage element 122 having terminals 168 that are connected via a DC power bus 128 to the input 164 of the inverter 124. The inverter 124 converts DC power received at the input 164 from the energy storage element 122 into AC power at the output 166. In other embodiments, the motor 114 may be a DC motor, in which case the inverter 124 would generally be replaced by a DC to DC converter operable to convert DC power from the storage element 122 received at a storage element voltage (typically 24V, 48V, or higher) and to produce DC power at a suitable voltage for operating the DC motor.

The vehicle 100 further includes a pair of drive wheels 130 and 132 and a differential 134. The wheels 130 and 132 are coupled to the differential 134 by an axle 136 and the driveline shaft 118 transmits drive power through the differential 134 to the wheels 130 and 132.

In the embodiment shown in FIG. 1, the powertrain 101 further includes a power take-off (PTO) 140 having a PTO coupling 141 for coupling auxiliary equipment to receive a torque generated by the engine 102. Many conventional industrial and commercial vehicles are equipped with a power take-off output that provide operating power for auxiliary equipment such as water pumps, mechanical arms, compactors, dump truck bed actuators, and other applications. Operating power provided at the PTO output of a vehicle is generally made available at an output shaft coupling and may be coupled to a hydraulic pump or an electrical generator, for example. In the embodiment shown in FIG. 1, the PTO 140 includes a housing 139 that mounts on the transmission 106, but in other embodiments the PTO may be located on the engine. The PTO coupling 141 generally takes the form of a splined shaft that facilitates coupling to auxiliary equipment.

The gearbox 112 also includes an input/output 142, and the vehicle 100 further includes a PTO shaft 144 coupling between the PTO coupling 141 and the input/output 142. The input/output 142 may comprise a shaft that facilitates coupling to the PTO shaft 144. In this embodiment, the gearbox 112 also includes an auxiliary output 146 having an auxiliary output shaft 148 for coupling accessory equipment to receive take-off power from the vehicle 100.

The vehicle 100 further includes a controller 150 for controlling operation of the vehicle, the controller 150 including a plurality of input/output (I/O) ports. The controller 150 includes an I/O port 152 for receiving signals from sensors associated with operation of the engine 102 and for transmitting signals to the engine for controlling engine operation. The controller 150 also includes an I/O port 154 for receiving signals from the transmission 106 and for transmitting signals for controlling operation of the transmission. The controller 150 further includes an I/O port 156 for receiving signals from the PTO 140 and for transmitting signals to the PTO for controlling PTO operation, and an I/O port 158 for receiving signals from the gearbox 112 and for transmitting signals for controlling operations and/or configuring the gearbox. The controller 150 further includes an I/O port 160 for receiving signals from the inverter 124 and for transmitting control signals to the inverter. In this embodiment, the inverter 124 is also in direct communication with the motor 114 for receiving signals from sensors associated with operation of the motor (such as a signal representing a rotational speed of the motor, for example). The inverter 124 receives the sensor signals from the motor 114 and controls operation of the motor by controlling the AC power provided to the input 120 to cause the motor to generate a desired torque. The controller 150 further includes an I/O port 162 for receiving signals from the storage element 122, such as a state of charge signal, current and voltage limits, and/or power limits, for example.

In this embodiment the controller 150 is shown as a single integrated controller, but in some implementations controller functions may be distributed between a plurality of different controllers, which may be located in any of the engine 102, the motor 114, the transmission 106, the gearbox 112, the PTO 140, the energy storage element 122, and/or the inverter 124, for example.

In the embodiment shown the motor 114 may also be configured to act as a generator, in which case the input 120 may act as an electrical power output for generating AC power on the AC power bus 126. In this embodiment, the inverter 124 may be implemented as a bi-directional inverter, which is responsive to control signals produced at the I/O port 160 for configuring the inverter to receive AC input power at the output 166 and to produce DC power at the input 164. The DC power may be provided to the energy storage element 122 for charging or may be made available for operating other accessories. For example, the vehicle 100 may include an auxiliary power supply for providing an AC line voltage power outlet at 110V or 220V for powering electrical devices or other appliances.

In the embodiment shown in FIG. 1 the gearbox 112 of the apparatus 110 includes a planetary gear system 138. The motor 114 is operable to generate a torque and the planetary gear system 138 is operable to receive torque generated by the motor and is selectively configurable to transmit a starting torque through the input/output 142 and shaft 144 to the PTO 140 for starting the engine 102.

Figure 2:
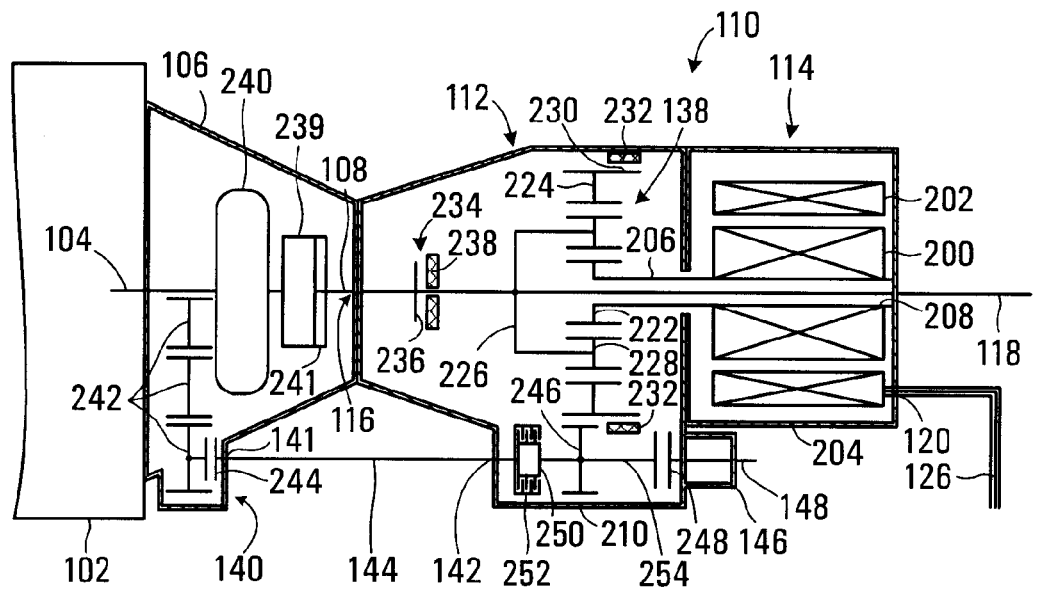
FIG. 2 is a schematic view of the gearbox and motor apparatus shown in FIG. 1.
Figure 3:
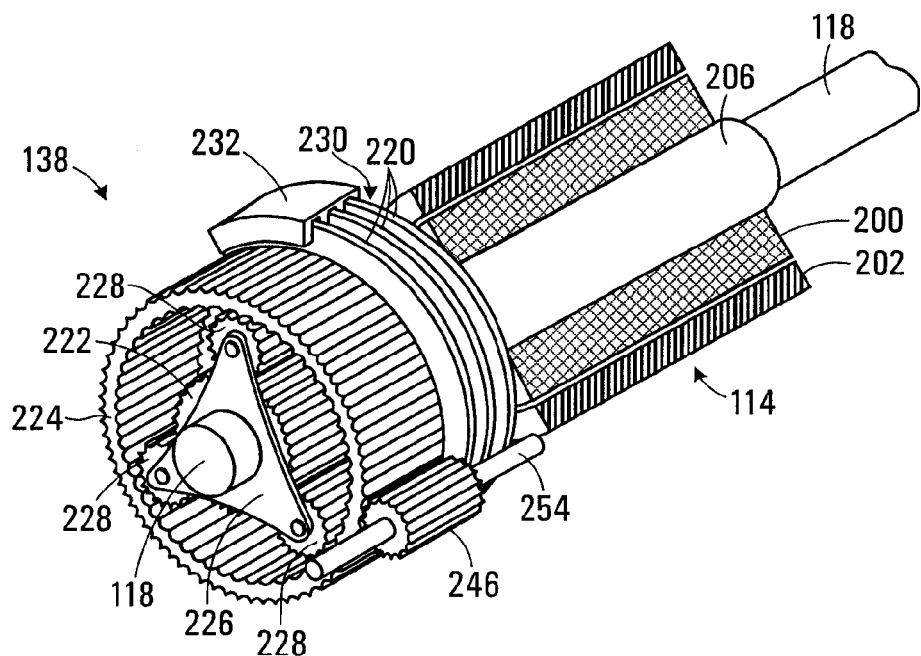
FIG. 3 is a perspective view of a planetary gear system used in the a gearbox shown in FIG. 2.

The apparatus 110 and transmission 106 are shown in greater detail in FIG. 2. Referring to FIG. 2, the gearbox 112 includes a housing 210 and the planetary gear system 138 is shown within the housing. The gears and clutches that make up the planetary gear system 138 are represented schematically in FIG. 2 and are shown in perspective view in FIG. 3. Referring to FIG. 3, the planetary gear system 138 includes a sun gear 222, a ring gear 224, and a planet carrier 226 coupled to a plurality of planet gears 228. In this embodiment the planetary gear system 138 includes three planet gears 228, however in other embodiments there may be a greater number of planet gears or there may only be a single or a pair of planet gears. The planet gears 228 are coupled between the sun gear 222 and the ring gear 224. The ring gear 224 further includes a braking surface 230 and ring gear brake 232, which in this embodiment is implemented as a multi-plate brake having a plurality of plates 220 for increasing a holding capacity of the brake. The ring gear brake 232 is operable to be electrically actuated or actuated by hydraulic fluid pressure, for example, to engage the braking surface 230 to prohibit rotation of the ring gear for transmitting torque between the sun gear 222 and planet carrier 226. The controller 150 (shown in FIG. 1) is operable to generate a ring gear brake control signal at the I/O port 158 for controlling the engagement state of the ring gear brake 232.

Referring back to FIG. 2, in the embodiment shown, the planet carrier 226 is coupled to the driveline shaft 118 and the gearbox 112 further includes a driveline brake 234 for prohibiting rotation of the driveline shaft 118. The driveline brake 234 includes a braking surface 236 and a brake 238 that is operable to be selectively engaged to prohibit rotation of the driveline shaft 118 and the planet carrier 226. When the driveline brake 234 is in the braking state, rotation of the planet carrier 226 is prohibited and torque is transmitted between the sun gear 222 and the ring gear 224. The controller 150 (shown in FIG. 1) is also operable to generate a driveline brake control signal at the I/O port 158 for controlling the engagement state of the driveline brake 234. The driveline brake 234 may be electrically actuated or actuated by hydraulic fluid pressure, for example. Hydraulic fluid pressure may be generated by a hydraulic pressure generator such as an electrically operated hydraulic pump, a mechanically actuated hydraulic pump, or by connecting to the transmission 106 to receive hydraulic fluid pressure generated in the transmission. Additionally, the hydraulic fluid generator may include an accumulator as described later herein in connection with FIG. 13, for operating clutches and brakes in the gearbox 112 when the engine is not running.

The motor 114 includes a rotor 200 and a stator 202 enclosed with a motor housing 204. The rotor 200 is coupled to a hollow shaft 206, which includes a bore 208 sized to accommodate the driveline shaft 118. The stator 202 is rotationally fixed within the motor housing 204. In one embodiment, the rotor 200 may be a permanent magnet rotor and the stator 202 may be a wound stator, in which case AC current for operating the motor 114 is supplied to the stator at the input 120 from the AC power bus 126. When operating the motor 114 as an electrical generator, a torque is received via the hollow shaft 206 causing the rotor 200 to rotate and an AC output current is generated by the stator 202 at the input 120, which thus acts as an output. In other embodiments, the motor 114 may be an induction motor having a wound stator and a rotor that operates through electromagnetic induction, for example.

The housing 210 of the gearbox 112 in the embodiment shown interfaces with the motor housing 204 such that the hollow shaft 206 extends into the gearbox housing and is coupled to the sun gear 222 for transmitting torque between the motor 114 and the sun gear. The motor 114 is thus mechanically coupled to supply torque to the sun gear 222 of the planetary gear system 138.

In the embodiment shown in FIG. 2, the transmission 106 is an automatic transmission and includes a torque converter 240 coupled between the engine output shaft 104 and a transmission planetary gear set 239. The transmission planetary gear set 239 is operable to convert the output speed and torque produced by the engine 102 at the engine output shaft 104 into suitable speed and torque ranges for providing power for operating the vehicle 100. In general, the transmission planetary gear set 239 may include more than one planetary gear set in various configurations of sun, ring, and planet gears, depending on the particular implementation, required performance, and the mass of the vehicle 100, for example. In this embodiment the transmission 106 also includes at least one overrunning clutch 241, such as a sprag clutch, coupled between an output of the transmission planetary gear set 239 and the transmission output shaft 108. When the rotational speed of the transmission output shaft 108 is greater than the rotational speed at the output of the transmission planetary gear set 239, the overrunning clutch 241 effectively disengages the planetary gear set from the transmission output shaft. Such a condition would occur, for example, when the vehicle 100 is coasting downhill and the wheels 130, 132 of the vehicle 100 cause the driveline shaft 118, and thus the transmission output shaft 108, to rotate faster than the output of the transmission planetary gear set 239. Overrunning clutches are generally implemented in a transmission to improve drivability of the vehicle 100, for example by removing an engine drag torque when the vehicle is coasting. The transmission 106 would generally also include components such as a transmission fluid pump and various other clutches and bands necessary for operation of the transmission (not shown in FIG. 2).

In another embodiment the function of the overrunning clutch 241 may be provided by a conventional clutch, or the overrunning clutch and driveline brake 234 functions may be provided by a 3-way clutch (not shown) that replaces the driveline brake. The 3-way clutch would facilitate selectively coupling between the driveline shaft 118 and the transmission output shaft 108, when in an engaged state, for transmitting torque to the driveline shaft 118. In a disengaged state, the 3-way clutch would decouple the driveline 118 from the transmission output shaft 108. In a third braking state, the a-way clutch would implement the braking function of the driveline brake 234 to prohibit rotation of the driveline shaft 118 and the planet carrier 226.

In this embodiment, the PTO 140 includes a plurality of PTO gears 242, which are coupled to the engine output shaft 104 to receive engine output torque. In the embodiment shown, the PTO 140 includes three gears for causing a direction of rotation of the PTO coupling 141 to be opposite to the direction of rotation of the engine output shaft 104. In other embodiments, fewer gears or additional gearing may included for transmitting torque through the PTO 140 to the PTO coupling 141. The PTO 140 further includes a PTO clutch 244, which is operable to engage to transmit torque to the PTO coupling 141 and thus to the PTO shaft 144. The PTO clutch 244 may be hydraulically or electrically actuated in response to a PTO clutch control signal generated by the controller 150 at I/O port 156 (shown in FIG. 1).

In many conventional PTO configurations the PTO gears 242 transmit torque generated by the engine 102 through the PTO clutch 244 to the PTO 140. However, in the embodiment of the invention shown in FIG. 2, the PTO 140 is also operable to receive a torque at the PTO coupling 141 and to transmit the torque through the PTO clutch 244 and PTO gears 242 to the engine output shaft 104. PTO outputs are provided in many commercial and industrial vehicles, although the configuration and gearing may differ from that shown at 140 in FIG. 2.

The input/output 142 of the gearbox 112 provides for coupling the PTO shaft 144 between the PTO coupling 141 of the PTO 140 and the gearbox. The gearbox 112 further includes a sprocket gear 246 coupled to receive torque from the ring gear 224 and to transmit torque to the ring gear. The sprocket gear 246 is coupled to a sprocket shaft 254. The auxiliary output 146 of the gearbox 112 includes an auxiliary output clutch 248, which is configured to transmit torque from the sprocket shaft 254 to the auxiliary output shaft 148. In this embodiment, the sprocket gear 246 also functions to cause the sprocket shaft and auxiliary output shaft 148 to have a rotational direction that is opposite to the direction of rotation of the driveline shaft 118. In other embodiments the engine and driveline shaft rotation may be otherwise configured, and the sprocket gear 246 may be implemented as a plurality of gears to provide a desired direction of rotation of the auxiliary output shaft 148.

In the embodiment shown in FIG. 2, the gearbox 112 includes an overrunning clutch 250 and a bypass clutch 252 coupled in parallel between the sprocket shaft 254 and the input/output 142. The bypass clutch 252 is shown in FIG. 2 as a multi-plate clutch, although other types of clutches may be implemented in place of the multi-plate clutch. When the bypass clutch 252 is disengaged, the overrunning clutch 250 provides for torque transmission from the sprocket shaft 254 via the input/output 142 to the PTO shaft 144 for starting the engine 102, while preventing torque transfer back from the engine to the sprocket gear 246, similar to the operation described above in connection with the overrunning clutch 241. The bypass clutch 252, when engaged provides for torque transfer in both directions between the input/output 142 and the sprocket shaft 254, as described later herein.

In operation, the planetary gear system 138, ring gear brake 232, driveline brake 234, PTO clutch 244, overrunning clutch 250 and bypass clutch 252 facilitate selective configuration of the gearbox 112 by the controller 150 in a plurality of different modes as described in greater detail below.

Engine Drive Mode

Figure 4:
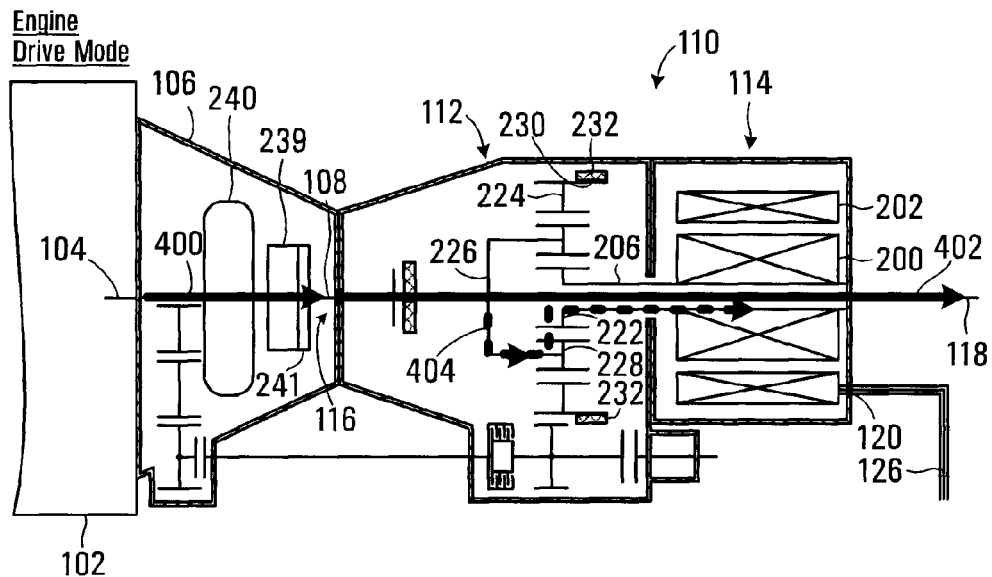
FIG. 4 is a schematic view of the apparatus of FIG. 2 configured in an engine drive mode.

Referring to FIG. 4, the apparatus 110 is shown configured in an engine drive mode in which mechanical power is generated by the engine 102. In this operational mode, torque generated by the engine 102 at the engine output shaft 104 is transmitted through the torque converter 240, transmission planetary gear set 239, and overrunning clutch 241, to the transmission output shaft 108 as indicated by the line and arrow 400. The torque 400 received at the gearbox input 116 is thus transmitted through the gearbox 112 on the driveline shaft 118 for providing drive power to the vehicle 100, as shown by the line and arrow 402.

In the embodiment shown the planet carrier 226 in the gearbox 112 is coupled to the driveline 118, and thus the torque provided to the driveline shaft also causes the plurality of planet gears 228 to rotate. In this embodiment, the controller 150 (shown in FIG. 1) may further generate a ring gear brake control signal at the I/O port 158 to cause the ring gear brake 232 to engage the braking surface 230 of the ring gear 224 to prohibit rotation of the ring gear. Under these conditions, a portion of the torque at the driveline shaft 118 is transmitted to the planet carrier 226 and plurality of planet gears 228, and through the sun gear 222 to the hollow shaft 206 to provide a generating torque to the motor 114 for generating electrical power. The generating torque may be supplied either by the engine 102 or may be provided through regenerative braking, where kinetic energy of the vehicle is transmitted through the wheels 130 and 132, axle 136, and the differential 134 (shown in FIG. 1) to the driveline shaft 118. Power flow associated with the generating torque is indicated by the broken line and arrow 404. In this embodiment, the motor 114 acts as a generator for generating electrical power at the input 120 (which acts as a generator output). The generated electrical power is fed back to the inverter 124 for charging the energy storage element 122. For a motor 114 having a permanent magnet rotor 200, the stator 202 produces an AC current at the electrical input 120 and the inverter 124 is configured to receive the electrical power on the AC power bus 126 at the inverter output 166. To discontinue generation of electrical power by the motor 114, the inverter 124 is configured to stop drawing current from the AC power bus 126 and any load due to rotation of the rotor 200 is then effectively removed, apart from windage and friction effects.

The rotational speed of the motor 114 may be subjected to maximum rotational speed constraints due to mechanical limits and/or back electromotive force (EMF) generation by the motor at high rotational speeds. Under high vehicle speed conditions the driveline shaft 118 causes the planet carrier 226 and thus the sun gear 222 and rotor 200 to rotate at correspondingly high rotational speed and these motor constraints may come into play making it necessary to limit the rotational speed of the motor 114 by configuring the inverter 124 to draw power on the AC power bus 126, for example. Alternatively or additionally, in embodiments where it is not required or desired to generate power, the ring gear brake 232 may remain in the disengaged state, thus permitting rotation of both the sun gear 222 and the ring gear 224. Under these conditions, the rotational speed of the planet carrier 226 would split between the sun gear 222 and the ring gear 224 causing the rotor 200 of the motor 114 to spin at a reduced rotational speed in accordance with the inertial, frictional, and other loading that these gears present.

Electric Drive Mode

Figure 5:
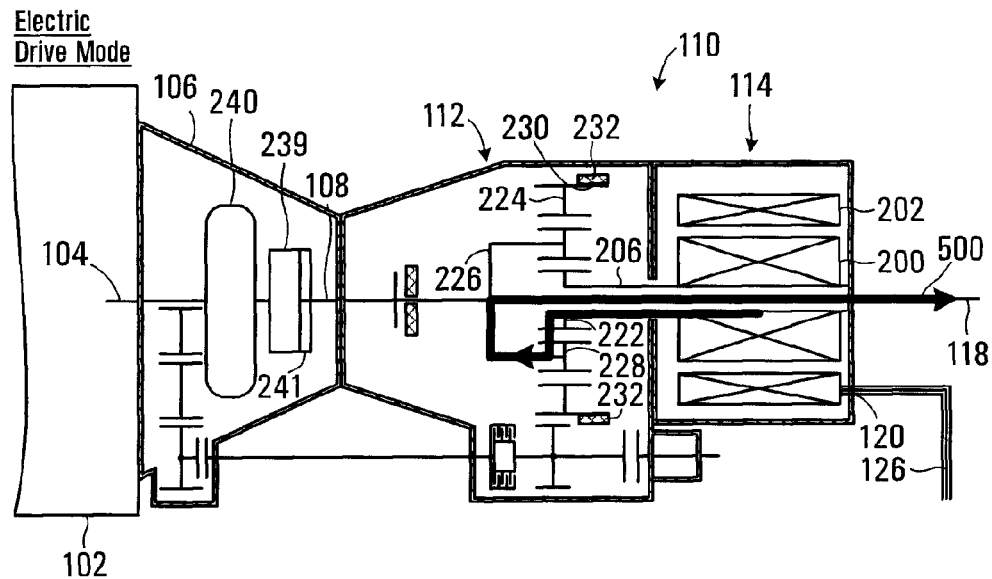
FIG. 5 is a schematic view of the apparatus of FIG. 2 configured in an electric drive mode.

Referring to FIG. 5, the apparatus 110 is shown configured in an electric drive mode in which power for operating the vehicle 100 is provided by the motor 114. In this operational mode the inverter 124 (shown in FIG. 1) provides an excitation current on the AC power bus 126, which is received at the input 120 of the motor 114, causing the rotor 200 to rotate to generate a motor torque. The motor torque is transmitted through the hollow shaft 206 to the sun gear 222. The controller 150 (shown in FIG. 1) also generates a ring gear brake control signal at the I/O port 158 to cause the ring gear brake 232 to engage the braking surface 230 of the ring gear 224 to prohibit rotation of the ring gear. When rotation of the ring gear 224 is prohibited, the motor torque transmitted through the hollow shaft 206 to the sun gear 222 is transmitted through the plurality of planet gears 228 to the planet carrier 226, and thus to the driveline shaft 118. Power flow in the electric drive mode is indicated by the line and arrow 500 in FIG. 5. Under these conditions, the motor 114 is configured to deliver drive power to the driveline shaft 118 for driving the wheels 130 and 132 of the vehicle 100.

When the vehicle 100 is being decelerated or coasting downhill, torque on the driveline shaft 118 would not be required, in which case the motor 114 may be configured in a regenerative braking mode. In the regenerative braking mode the motor 114 is configured to act as a generator, as described above. Kinetic energy of the vehicle is transmitted through the wheels 130 and 132, axle 136, and the differential 134 (shown in FIG. 1) to the driveline shaft 118, and a generating torque is received at the rotor 200 via the planetary gear system 138 and hollow shaft 206. The inverter 124 (shown in FIG. 1) is configured to draw current from the AC power bus 126, thus causing the rotor 200 to act as a load on the driveline shaft 118 for maintaining or reducing the speed of the vehicle 100 while providing electrical power for charging the energy storage element 122 on the DC power bus 128.

In the embodiment shown, the overrunning clutch 241 prevents torque from being transmitted from the driveline shaft 118 back to the transmission planetary gear set 239 and torque converter 240 of the transmission 106. Similarly, when transitioning to the electric drive mode from the engine drive mode shown in FIG. 4, the controller 150 (shown in FIG. 1) produces an engine control signal at the I/O port 152 to cause the engine to stop and the overrunning clutch 241 prevents torque from being transmitted from the driveline shaft 118 back to the transmission planetary gear set 239 and torque converter 240. For a gasoline engine, the engine control signal produced at the I/O port 152 may cause an ignition system associated with the engine to be disabled to cause the engine to stop while for a diesel engine the engine control signal may control the flow of fuel to the engine.

Hybrid Drive Mode

Figure 6:
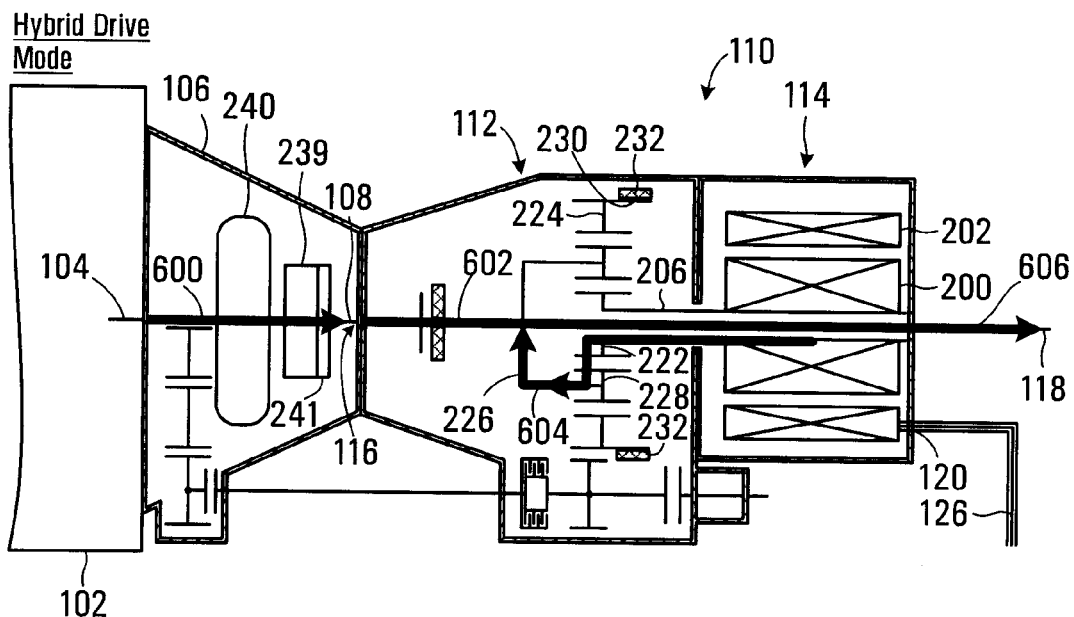
FIG. 6 is a schematic view of the apparatus of FIG. 2 configured in a hybrid drive mode.

Referring to FIG. 6, the apparatus 110 is shown configured in a hybrid drive mode in which power for operating the vehicle 100 is provided by both the engine 102 and the motor 114. Torque generated by the engine 102 at the engine output shaft 104 is transmitted through the torque converter 240, transmission planetary gear set 239, and overrunning clutch 241, to the transmission output shaft 108 as indicated by the line and arrow 600. The torque 600 received from the transmission output shaft 108 at the gearbox input 116 is thus transmitted through the gearbox 112 on the driveline shaft 118 for providing a first portion of the drive power to the vehicle 100, as shown by the line and arrow 602.

The inverter 124 also provides an excitation current on the AC power bus 126 causing the motor 114 to generate a motor torque, which is transmitted through the hollow shaft 206 to the sun gear 222. The controller 150 (shown in FIG.

1) generates a ring gear brake control signal at the I/O port 158 to cause the ring gear brake 232 to engage the braking surface 230 of the ring gear 224 to prohibit rotation of the ring gear such that the motor torque is transmitted through the plurality of planet gears 228 to the planet carrier 226, and thus to the driveline shaft 118. Power flow from the motor 114 to the driveline shaft 118 is shown by the line and arrow 604 and the combined power flow due to the respective torques generated by the motor 114 and engine 102 is indicated by the line and arrow 606.

The first and second portions of drive power received from the engine 102 and motor 114 respectively at the driveline shaft 118 are transmitted to the wheels 130 and 132 (shown in FIG. 1) for driving the vehicle 100. The controller 150 is further configured to apportion the drive power required by the vehicle 100 between the engine 102 and the motor 114 in accordance with current vehicle operating conditions such as vehicle speed, desired acceleration, the grade of the terrain being traversed, and fuel and storage element relative efficiencies and/or costs, for example. As in the electric drive mode, when the vehicle 100 is being decelerated or coasting downhill the motor 114 may be configured in a regenerative braking mode as described above.

In a two-wheel drive vehicle such as that shown in FIG. 1, for each of the conventional, electric, and hybrid drive modes described above, drive torque from the driveline shaft 118 is transmitted to the driven wheels 130 and 132. In four-wheel drive vehicle embodiments, a portion of the torque at the driveline shaft 118 would be transmitted through a transfer case (not shown) to provide torque to the remaining pair of wheels of the vehicle. The four-wheel drive embodiment would thus also be applicable to each of the drive modes disclosed above. In one embodiment, the apparatus 110 may be incorporated in a four-wheel drive transfer case for providing both hybrid drive and four-wheel drive elements in a single transfer case/hybrid powertrain unit.

Engine Start while Moving

In the above engine drive mode and hybrid drive mode, it is assumed that the engine 102 is running and generating at least a portion of the drive torque for operating the vehicle 100. A separate starter motor is commonly included in most vehicles and many hybrid vehicles for starting the engine. However in the vehicle embodiment shown in FIG. 1 a starter motor is not provided and the engine 102 is started by using a starting torque generated by the motor 114 and by configuring the planetary gear system 138, driveline brake 234, ring gear brake 232, bypass clutch 252 and PTO clutch 244 to couple the starting torque back to the engine 102.

Figure 7:
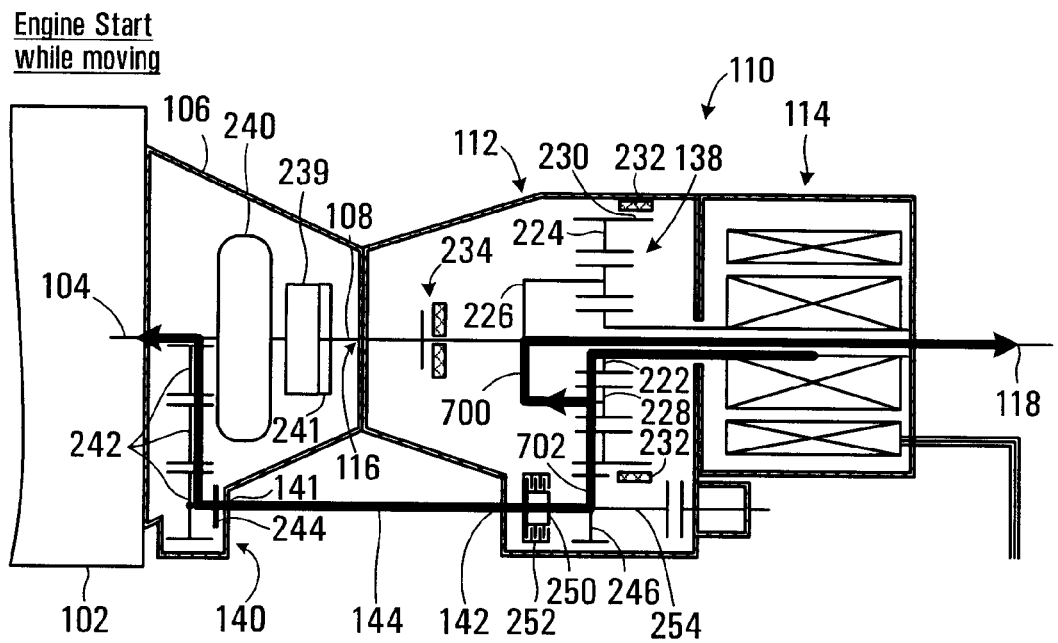
FIG. 7 is a schematic view of the apparatus of FIG. 2 configured for starting an engine of the hybrid vehicle while the vehicle is moving.

Referring to FIG. 7, the apparatus 110 is shown configured for an engine start, in which the vehicle 100 is initially moving under power provided by the motor 114 in the electric vehicle mode as described above in connection with FIG. 5. In the electric drive mode, the ring gear brake 232 is engaged to cause torque generated by the motor 114 to be transmitted through the plurality of planet gears 228 and planet carrier 226 to the driveline shaft 118. The controller 150 (shown in FIG. 1) initiates the engine start by generating a PTO clutch control signal at the I/O port 156 to cause the PTO clutch 244 to be engaged. The controller 150 also generates a control signal at the I/O port 158 to cause the bypass clutch 252 to be disengaged. The controller 150 then generates a ring gear brake control signal at the I/O port 158 to cause the ring gear brake 232 to disengage the braking surface 230 of the ring gear 224 to permit rotation of the ring gear. Under these conditions, the planet carrier 226 continues to transmit a drive portion of the torque generated by the motor 114 to the driveline shaft 118 as shown by the line and arrow 700. However, a starting portion of the motor torque shown by the line and arrow 702 is also transmitted to the ring gear 224, through the sprocket gear 246 and the overrunning clutch 250 to the input/output 142, and through the PTO shaft 144 to the PTO coupling 141. The starting torque received at the PTO coupling 141 is transmitted through the PTO clutch 244 and plurality of PTO gears 242 to the engine output shaft 104 for cranking the engine. Advantageously, in this embodiment the configuration of the transmission 106 has the PTO 140 coupled to the engine output shaft 104 and thus the starting torque does not pass through the torque converter 240. In general, torque converters are optimized to provide an efficient coupling of torque in one direction (e.g., between the engine output shaft 104 and the transmission planetary gear set 239) and usually provide an inefficient coupling of torque in the opposite direction, which would result in significant mechanical losses if the starting portion of the motor torque were to be coupled through the torque converter 240 to the engine output shaft 104.

The motor torque generated by the motor 114 is thus transmitted through the planetary gear system 138 to both the ring gear 224 and the planet carrier 226. In order to provide sufficient starting torque, the controller 150 may produce an inverter control signal at the I/O port 160 to cause increased torque generation by the motor 114 to provide the necessary starting torque. In one embodiment, the controller 150 (shown in FIG. 1) may be configured to only produce an engine control signal at the I/O port 152 for causing the engine to start once it is determined that a rotational speed of the engine 102 as monitored through the I/O port 152 is sufficient to start the engine.

When the engine 102 starts generating torque, the torque is coupled through the torque converter 240, transmission planetary gear set 239, and the overrunning clutch 241 to the driveline shaft 118. The engine 102 may experience a transient overspeed condition when starting and the overrunning clutch 250 acts to decouple torque from being fed back through the PTO coupling 141 to the input/output 142, to reduce potentially high transient loads being transmitted to the gearbox 112. In one embodiment, the controller 150 may detect the engine start by monitoring the speed of the engine at the I/O port 152 to detect the transient overspeed condition, whereafter the controller 150 generates a ring gear brake control signal at the I/O port 158 to cause the ring gear brake 232 to be engaged so that the torque from the motor 114 is once again transmitted only to the driveline shaft 118. In other embodiments the engine start may be determined by the controller 150 monitoring other operating conditions, such as the motor speed for example. The controller 150 also generates a PTO control signal at the I/O port 156 to cause the PTO clutch 244 to be disengaged.

The drive mode of the vehicle 100 may then be transitioned to either a engine drive mode or a hybrid drive mode by configuring the planetary gear system 138, driveline brake 234, ring gear brake 232, and PTO clutch 244 in accordance with the respective modes as described above with reference to FIG. 4 and FIG. 6 respectively.

Engine Start while Stationary

Figure 8:
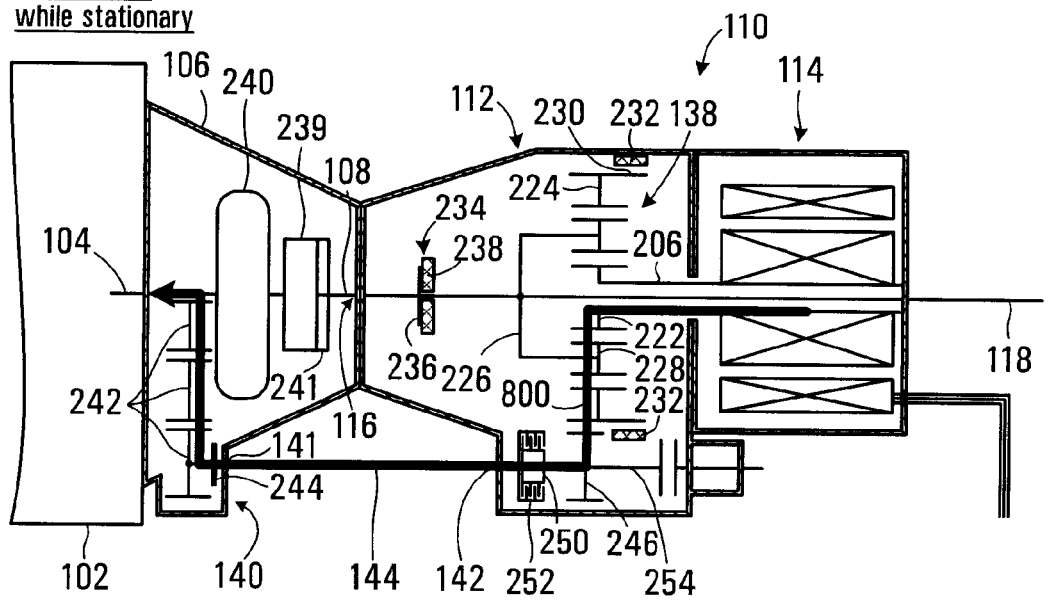
FIG. 8 is a schematic view of the apparatus of FIG. 2 configured for starting the engine while the vehicle is stationary.

Referring to FIG. 8, the apparatus 110 is shown configured for a stationary engine start, in which the vehicle 100 is not moving while starting and starting torque is provided by the motor 114. The controller 150 (shown in FIG. 1) initiates the start by generating a driveline brake control signal at the I/O port 158 to cause the brake 238 of the driveline brake 234 to engage the braking surface 236, placing the driveline brake 234 in the braking state such that rotation of the driveline shaft 118, and the planet carrier 226 is prohibited. Under these conditions the vehicle 100 is prevented from moving. The controller 150 also generates a PTO clutch control signal at the I/O port 156 to cause the PTO clutch 244 to be engaged for transmitting torque. The controller 150 then generates a ring gear brake control signal at the I/O port 158 to cause the ring gear brake 232 to disengage the braking surface 230 of the ring gear 224 to permit rotation of the ring gear. The controller 150 also produces a control signal at the I/O port 160 to cause the inverter 124 to provide an excitation current on the AC power bus 126 to cause the motor 114 to generate a starting torque, which is transmitted through the hollow shaft 206 to the sun gear 222. Under these conditions, the starting torque generated by the motor 114 is transmitted through the ring gear 224 to the sprocket gear 246 and sprocket shaft 254. The starting torque on the sprocket shaft 254 is transmitted through the overrunning clutch 250 to the input/output 142, and through the PTO shaft 144 to the PTO coupling 141. The starting torque received at the PTO coupling 141 is transmitted through the PTO clutch 244 and plurality of PTO gears 242 to the engine output shaft 104, for cranking the engine. Since the driveline shaft 118 is held in a braked state by the driveline brake 234, the full torque generated by the motor 114 is coupled through the planetary gear system 138 to the PTO shaft 144 and thus to the engine 102 for starting.

Finally, the controller 150 is also configured to produce an engine control signal at the I/O port 152 for causing the engine ignition to be activated to start the engine. As in the FIG. 8 embodiment, the controller 150 may be configured to only produce an engine control signal at the I/O port 152 for causing the engine to start once it is determined that a rotational speed of the engine 102 as monitored through the I/O port 152 is sufficient to start the engine. When the engine 102 starts, torque generated by the engine is coupled to both the torque converter 240 and the PTO 140. While the driveline brake 234 is engaged, the transmission output shaft 108 is prohibited from rotating and at low engine speed the torque provided to the torque converter 240 would be dissipated within the torque converter. However, at higher engine speed, the engine would likely stall and accordingly the controller 150 may generate a control signal at the I/O port 154 to cause the transmission planetary gear set 239 to be configured in a neutral condition where torque is not transmitted to the transmission output shaft 108. Once the controller 150 determines that the engine 102 has started, the controller generates control signals to discontinue cranking of the engine.

Alternatively, if it is desired to transition to the engine drive mode as described above in connection with FIG. 4, the controller 150 generates a PTO clutch control signal at the I/O port 156 to cause the PTO clutch 244 to be disengaged and a driveline brake signal at the I/O port 158 to cause the driveline brake 234 to be disengaged.

The stationary vehicle start is useful for operations where engine torque is to be used for non-drive purposes, such as providing auxiliary output power or charging the storage element 122, for example.

Engine PTO and Stationary Power Generation Mode

Figure 9:
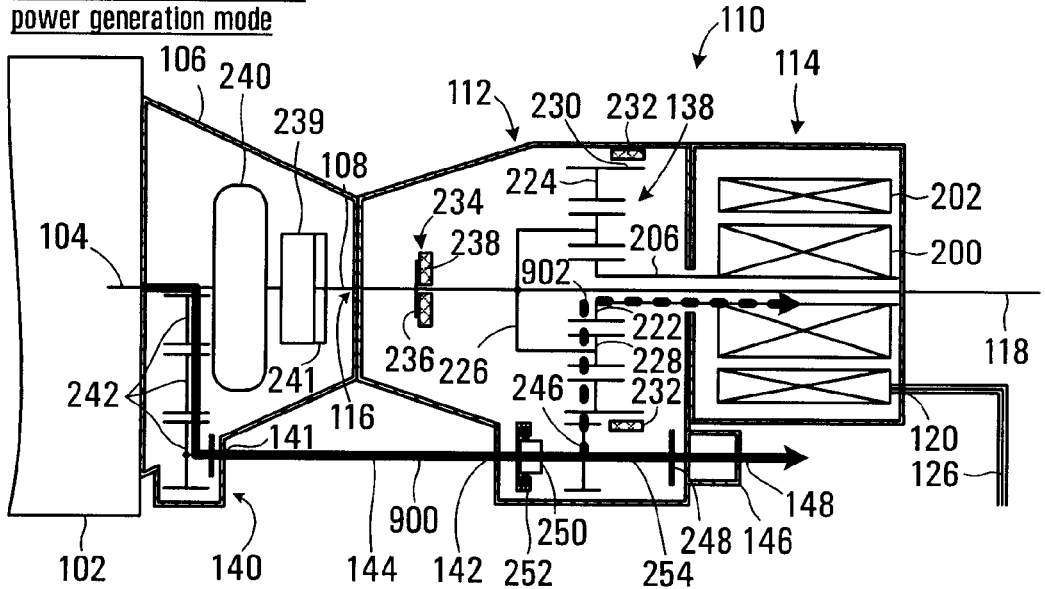
FIG. 9 is a schematic view of the apparatus of FIG. 2 configured for supplying auxiliary power from the engine while the vehicle is stationary.

Referring to FIG. 9, when the engine 102 has been started, such as described above in connection with FIG. 8, the gearbox 112 of the apparatus 110 may be further configured to provide PTO power at the auxiliary output 146 while the vehicle 100 is stationary. In this mode, power is provided by the engine 102 and the controller 150 (shown in FIG. 1) generates a control signal at the I/O port 160 to cause the inverter to discontinue generating motor torque by removing excitation current from the electrical input 120. The PTO clutch 244 in the PTO housing 139 remains engaged and the driveline brake 234 remains in the braked state so that the driveline 118 is prohibited from rotating and the vehicle 100 remains stationary. Under these conditions, torque generated by the engine 102 is transmitted from the engine output shaft 104, through the PTO gears 242, through the PTO clutch 244 to the PTO coupling 141, and through the PTO shaft 144 to the gearbox input/output 142. The controller 150 generates a control signal at the I/O port 158 to cause the bypass clutch 252 to be engaged so that torque is transmitted to the sprocket shaft 254, bypassing the overrunning clutch 250. In this embodiment, the controller 150 also generates a clutch control signal at the I/O port 158 to cause the auxiliary output clutch 248 to be engaged and torque is thus transmitted to the auxiliary output shaft 148 of the auxiliary output 146. Power provided by the engine 102 is thus made available at the auxiliary output 146 for operating accessories, as indicated by the line and arrow 900.

In the embodiment shown in FIG. 9, since the ring gear brake 232 is configured to permit rotation of the ring gear 224 while the planet carrier 226 is in the braked state, a portion of the torque shown by the broken line and arrow 902 is transmitted through the plurality of planet gears 228 to the sun gear 222, thus causing the rotor 200 to spin. By configuring the inverter 124 to receive current on the AC power bus 126 from the electrical input 120 the motor 114 may be configured as a generator for charging the energy storage element 122 or for powering electrical accessories and/or equipment. Alternatively, when no current is drawn from the AC power bus 126 by the inverter, the only load on the shaft 206 is due to windage effects of the rotor 200, friction losses in the motor 114 and the planetary gear system 138, and other mechanical losses in the apparatus 110. Accordingly, in the engine PTO mode, stationary power generation may also take place, and if the auxiliary output clutch 248 is disengaged all of the torque generated by the engine may be transmitted to the motor 114 for power generation purposes.

Engine PTO while Moving

Figure 10:
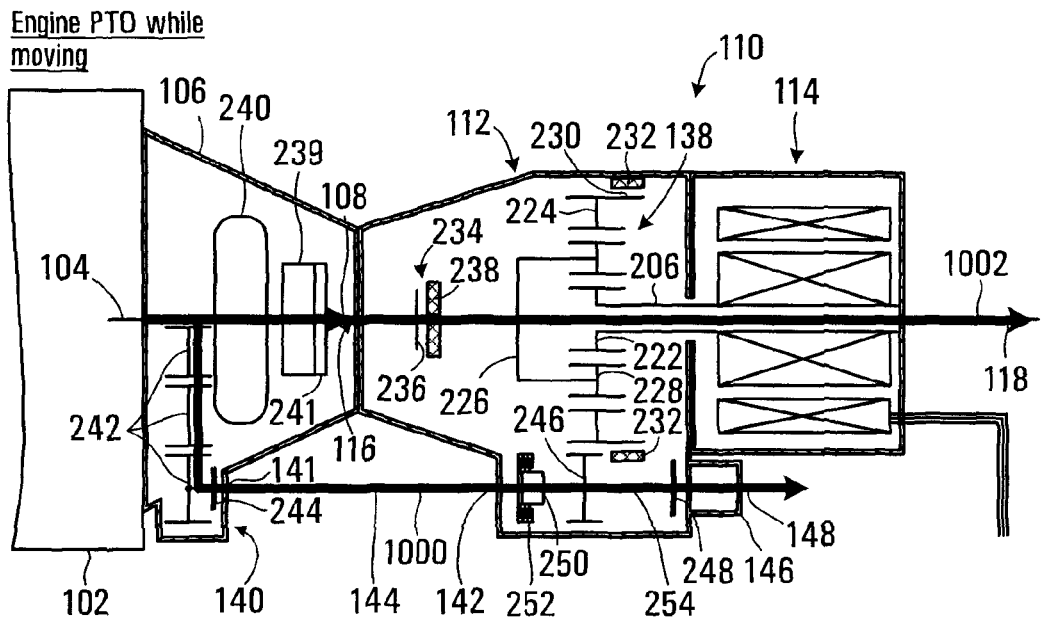
FIG. 10 is a schematic view of the apparatus of FIG. 2 configured for supplying auxiliary power from the engine while the vehicle is moving.

Referring to FIG. 10, the transmission 106 facilitates simultaneous operation of the PTO while the vehicle 100 is moving in the engine drive mode shown in FIG. 4. In this mode, power is provided by the engine 102 and the controller 150 (shown in FIG. 1) generates a control signal at the I/O port 160 to cause the inverter 124 to discontinue generating motor torque by removing excitation current from the electrical input 120. The controller 150 generates a PTO clutch control signal at the I/O port 156 to cause the PTO clutch 244 in the PTO housing 139 to be engaged, and a control signal at the I/O port 158 to cause the auxiliary output clutch 248 to be engaged. The driveline brake 234 would be disengaged for permitting rotation of the driveline shaft 118 while the vehicle 100 is moving.

Under these conditions, torque generated by the engine 102 is transmitted from the engine output shaft 104, through the PTO gears 242, through the PTO clutch 244 to the PTO coupling 141, and through the PTO shaft 144 to the gearbox input/output 142. The controller 150 further generates a control signal at the I/O port 158 to cause the bypass clutch 252 to be engaged to bypass the overrunning clutch 250 so that torque is transmitted to the sprocket shaft 254, and through the auxiliary output clutch 248 to the auxiliary output shaft 148, as indicated by the line and arrow 1000.

At the same time, engine torque is transmitted through the torque converter 240, transmission planetary gear set 239, and overrunning clutch 241 to the transmission output shaft 108, as indicated by the line and arrow 1002. The torque received at the gearbox input 116 is thus transmitted through the gearbox 112 on the driveline shaft 118 for providing drive power to the vehicle 100.

In this mode the rotor 200 of the motor 114 is coupled through the sun gear 222 and planet carrier 226 to the rotating driveline shaft 118 while the ring gear 224 is coupled to the rotating sprocket gear 246, which may cause the rotor to impose a constraint on the maximum vehicle speed. The motor 114 may also be configured to receive a generating torque as described above in connection with the FIG. 4 and FIG. 9 embodiments, or the motor may be configured to generate a drive torque as described above in connection with the FIG. 6 embodiment.

Electric PTO Mode while Stationary

Figure 11:
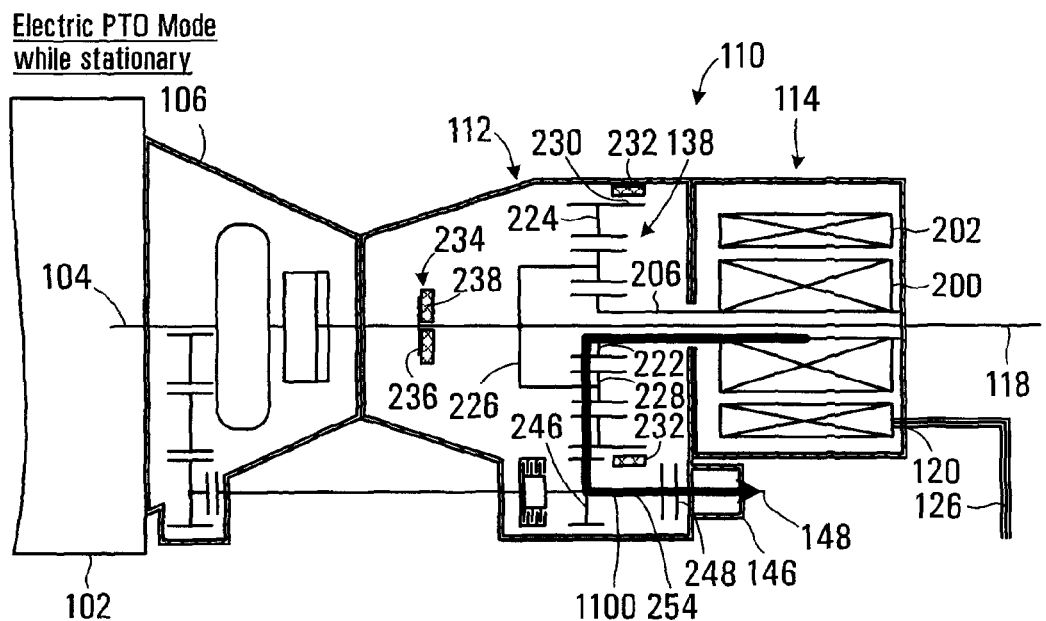
FIG. 11 is a schematic view of the apparatus of FIG. 2 configured for supplying auxiliary power from the motor while the vehicle is stationary.

Referring to FIG. 11, in an alternative operating embodiment, the apparatus 110 may be configured to cause the motor 114 to provide PTO power at the auxiliary output 146 while the vehicle 100 is stationary and the engine 102 is not running. In this mode the controller 150 (shown in FIG. 1) produces a PTO clutch control signal at the I/O port 156 to cause the PTO clutch 244 to be configured in the disengaged state. The controller 150 produces a driveline brake control signal at the I/O port 158 to cause the brake 238 of the driveline brake 234 to engage the braking surface 236 to prohibit rotation of the driveline 118, and the planet carrier 226. The controller 150 also generates a ring gear brake control signal at the I/O port 158 to cause the ring gear brake 232 to disengage the braking surface 230 of the ring gear 224 to permit rotation of the ring gear. The controller 150 also produces an inverter control signal to cause the inverter 124 to provide an excitation current to the electrical input 120 to cause the motor 114 to generate torque, which is transmitted through the hollow shaft 206 to the sun gear 222. Since the planet carrier 226 is prohibited from rotating, the torque is transmitted to the ring gear 224, which in turn transmits the torque to the sprocket gear 246 and sprocket shaft 254, through the auxiliary output clutch 248 to the auxiliary output 146, as shown by the line and arrow 1100. The controller 150 may also produce a bypass clutch control signal at the I/O port 158 to cause the bypass clutch 252 to be disengaged to remove loading presented by the PTO shaft 144.

Alternative Planetary Gear Configuration

Figure 12:
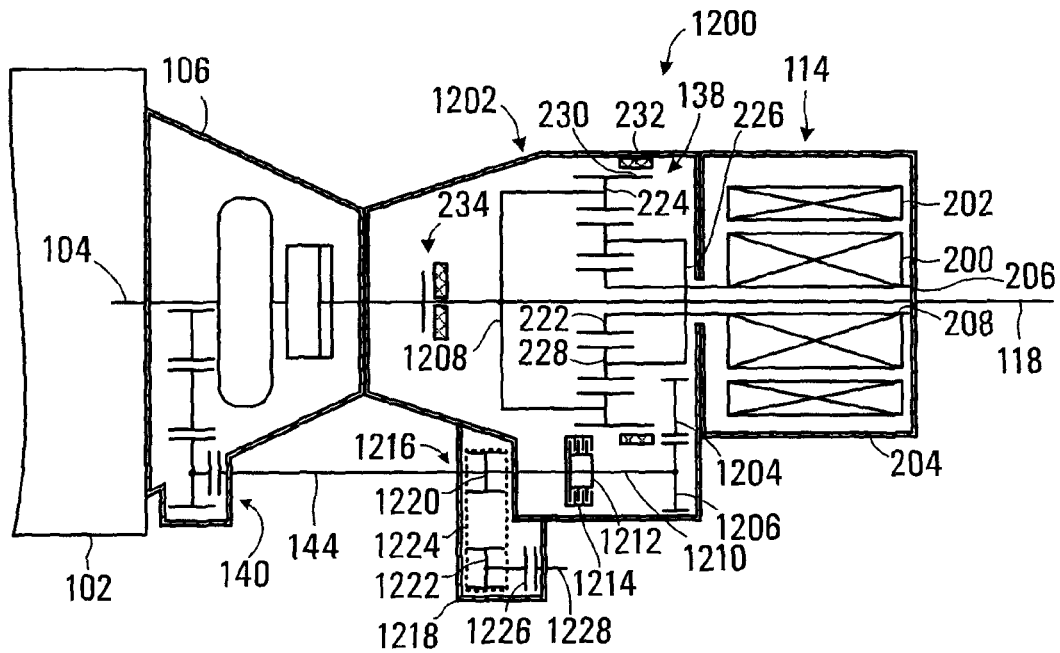
FIG. 12 is a schematic view of an alternative embodiment of an apparatus according to an alternative embodiment of the invention.

Referring to FIG. 12, an alternative embodiment of a gearbox and apparatus is shown generally at 1200. In this embodiment the engine 102, transmission 106, and motor 114 are similarly configured to the embodiment shown in FIG. 2. The motor 114 also remains coupled to the sun gear 222 through the hollow shaft 206. However in this embodiment the planetary gear system 138 is configured such that the planet carrier 226 is coupled through a pair of sprocket gears 1204 and 1206 to an intermediate shaft 1210. The intermediate shaft 1210 is coupled through an overrunning clutch 1212 and bypass clutch 1214 to an input/output 1216 of the gearbox 112. The planet carrier 226 is also not coupled to the driveline shaft 118 as in the FIG. 2 embodiment, but rather a coupling 1208 transmits torque between the ring gear 224 and the driveline shaft. The sprocket gear 1206 is included to cause a direction of rotation of the intermediate shaft 1210 to be reversed with respect to the direction of rotation of the sprocket gear 1204.

In other embodiments the planetary gear system 138 may be alternatively configured and may include a more complex gear configuration than shown in FIG. 2 and FIG. 12.

In the embodiment shown, an auxiliary output 1218 is shown in an alternative location on the gearbox 112 to that shown in FIG. 2. The auxiliary output 1218 is on the same side of the gearbox 112 as the input/output 1216 and includes a first chain sprocket 1220 coupled to the input/output. The auxiliary output 1218 also includes a second chain sprocket 1222 and a chain 1224 for transmitting torque from the first chain sprocket 1220 to the second chain sprocket. The second chain sprocket 1222 is coupled to transmit torque through an auxiliary output clutch 1226 to an auxiliary output shaft 1228. Operation of the auxiliary output 1218 is generally as described above in connection with the embodiments shown in FIGS. 4-11, and may be implemented in place of the auxiliary output 146 in these embodiments.

Alternative Transmission Embodiment

Figure 13:
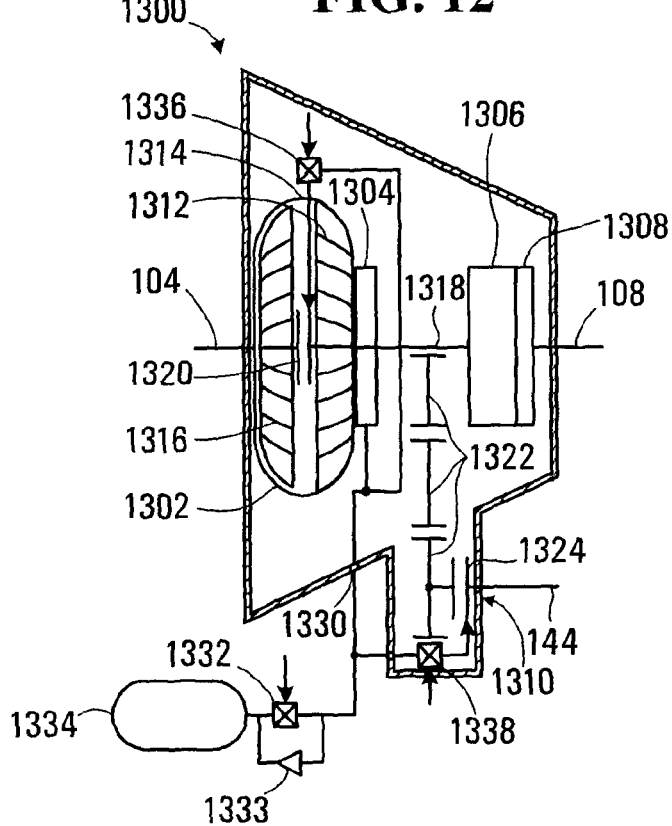
FIG. 13 is a schematic view of a transmission according to an alternative embodiment of the invention.

In another embodiment, the powertrain 101 shown in FIG. 1 may include an alternative transmission configured as shown at 1300 in FIG. 13. Referring to FIG. 13, the transmission 1300 includes a torque converter 1302, a fluid pump 1304, a transmission planetary gear set 1306, an overrunning clutch 1308, and a PTO 1310.

The torque converter 1302 is shown schematically in FIG. 13 and includes an impeller 1312 coupled to a torque converter housing 1314, the housing being coupled for rotation with the engine output shaft 104. The impeller 1312 thus acts as an input for receiving torque from the engine output shaft 104. The fluid pump 1304 is coupled to the housing 1314 and rotates with the impeller 1312 causing the fluid pump to generate hydraulic fluid pressure for operating various clutches and other hydraulic actuators within the transmission 1300. The torque converter 1302 also includes a turbine 1316, which is coupled to a torque converter output shaft 1318 that transmits torque from the turbine to the transmission planetary gear set 1306. In general torque converters also include a stator (not shown), which redirects fluid flow between the impeller 1312 and turbine 1316 for multiplying torque. In operation, transmission fluid circulated by the rotating impeller 1312 flows through the turbine 1316 to transmit torque through fluid coupling between the impeller and the turbine and thus between the engine output shaft 104 and the torque converter output shaft 1318. The torque converter 1302 further includes a lock-up clutch 1320 between the impeller 1312 and the turbine 1316. The lock-up clutch 1320 is operable when engaged to lock the respective rotations of the impeller 1312 and turbine 1316 for more efficient torque transfer through the torque converter. Commonly, the lock-up clutch 1320 would be hydraulically actuated using hydraulic fluid pressure provided by the fluid pump 1304, however in other embodiments the lock-up clutch 1320 may be electrically actuated or otherwise actuated.

In this embodiment the PTO 1310 includes a plurality of gears 1322 that are coupled to the torque converter output shaft 1318. The PTO 1310 also includes a PTO clutch 1324, which in this embodiment is hydraulically actuated using hydraulic fluid pressure provided by the fluid pump 1304. In other embodiments the PTO clutch 1324 may be electrically or otherwise actuated.

Torque converters such as the torque converter 1302 are generally configured to provide for relatively efficient torque transmission in one direction, i.e. between the engine output shaft 104 and the torque converter output shaft 1318, while torque transmission in the opposite direction is usually very inefficient. Since a starting torque delivered to the PTO 1310 through the shaft 144 would be coupled through the torque converter 1302 to the engine output shaft 104, the starting torque transfer under fluid coupling conditions would thus be inefficient. Advantageously, engaging the lock-up clutch 1320 significantly improves the efficiency of starting torque transmission to the engine output shaft 104. However, in the embodiment shown in FIG. 13, the fluid pump 1304 only operates to generate hydraulic pressure when the engine 102 is operating and thus clutch actuation is only possible when the shaft 1318 is rotating. Under conventional operations this is not problematic, since the lock-up clutch 1320 is usually only actuated at higher engine speeds when the fluid pump 1304 is operated at rated pressure. Additionally, the PTO clutch 1324 can also only be engaged when hydraulic pressure is being generated by the fluid pump 1304, and thus the starting torque can only be transmitted once hydraulic pressure is provided by the fluid pump 1304.

In the embodiment shown in FIG. 13, the transmission 1300 includes a hydraulic fluid input/output port 1330, which is coupled to the fluid pump 1304. The hydraulic fluid input/output port 1330 is in communication through a solenoid actuated valve 1332 with a hydraulic fluid accumulator 1334. A check valve 1333 is also provided in parallel with the solenoid actuated valve 1332. The solenoid actuated valve 1332 is initially actuated to close, and the check valve 1333 permits pressurized hydraulic fluid to be accumulated in the accumulator 1334 while the fluid pump 1304 is operating to generate hydraulic fluid pressure. Hydraulic accumulators generally include two chambers, a first chamber for receiving hydraulic fluid, which is generally incompressible, and a second compressive chamber for storing energy. The second compressive chamber may include a spring or compressed gas for exerting a force to pressurize the hydraulic fluid in the first chamber. When the hydraulic fluid pressure produced by the fluid pump 1304 reduces below the fluid pressure in the accumulator 1334 the check valve 1333 closes to maintain the pressure in the accumulator. In other embodiments the check valve 1333 may be omitted and the hydraulic pressure generated by the fluid pump 1304 and the hydraulic pressure in the accumulator 1334 may be monitored to determine when the valve 1332 should be actuated to cause the accumulator to receive hydraulic fluid.

The hydraulic fluid input/output port 1330 is also in communication with the lock-up clutch 1320 via a solenoid actuated valve 1336 and the PTO clutch 1324 via a solenoid actuated valve 1338. When it is desired to start the engine, the fluid pump 1304 is not generating hydraulic pressure and the valve 1332 is actuated to provide hydraulic fluid pressure at the hydraulic fluid input/output port 1330, which provides hydraulic pressure. The hydraulic pressure need only be sufficient to engage the PTO clutch 1324 for transmitting the starting torque through the PTO 1310 in response to actuating the valve 1338 and to engage the lock-up clutch 1320 to provide for efficient transfer of the starting torque through the torque converter 1302 to the engine output shaft 104, in response to actuation of the valve 1336.

Once the engine 102 has started, the fluid pump 1304 is operable to generate hydraulic fluid pressure and the accumulator 1334 again accumulates pressurized hydraulic fluid for the next engine starting cycle, as described above.

In other embodiments, an electrically powered hydraulic pump (not shown) may be implemented in place of the hydraulic fluid accumulator 1334 and valve 1332. The hydraulic pump may be powered using DC power provided by a vehicle battery, such as the energy storage element 122 shown in FIG. 1 or by a conventional 12V lead acid battery, for example. The electrically powered hydraulic pump would be provided with a supply of hydraulic fluid (for example from the transmission 1300) and when actuated would operate to provide pressurized hydraulic fluid at the hydraulic fluid input/output port 1330 for actuating the lock-up clutch 1320 and PTO clutch 1324.

The hydraulic accumulator embodiments described above in connection with FIG. 13 may be implemented generally as shown in any of the previously described embodiments of FIG. 1-12 to provide hydraulic fluid pressure for operating various clutches, brakes, and other hydraulically actuated systems of the vehicle 100. For example, in the embodiment shown in FIG. 2, the hydraulic fluid accumulator 1334 may be implemented to provide hydraulic operating pressure for operating the PTO clutch 244 when the engine 102 is not running.

Motor Coupled Directly to the PTO

Figure 14:
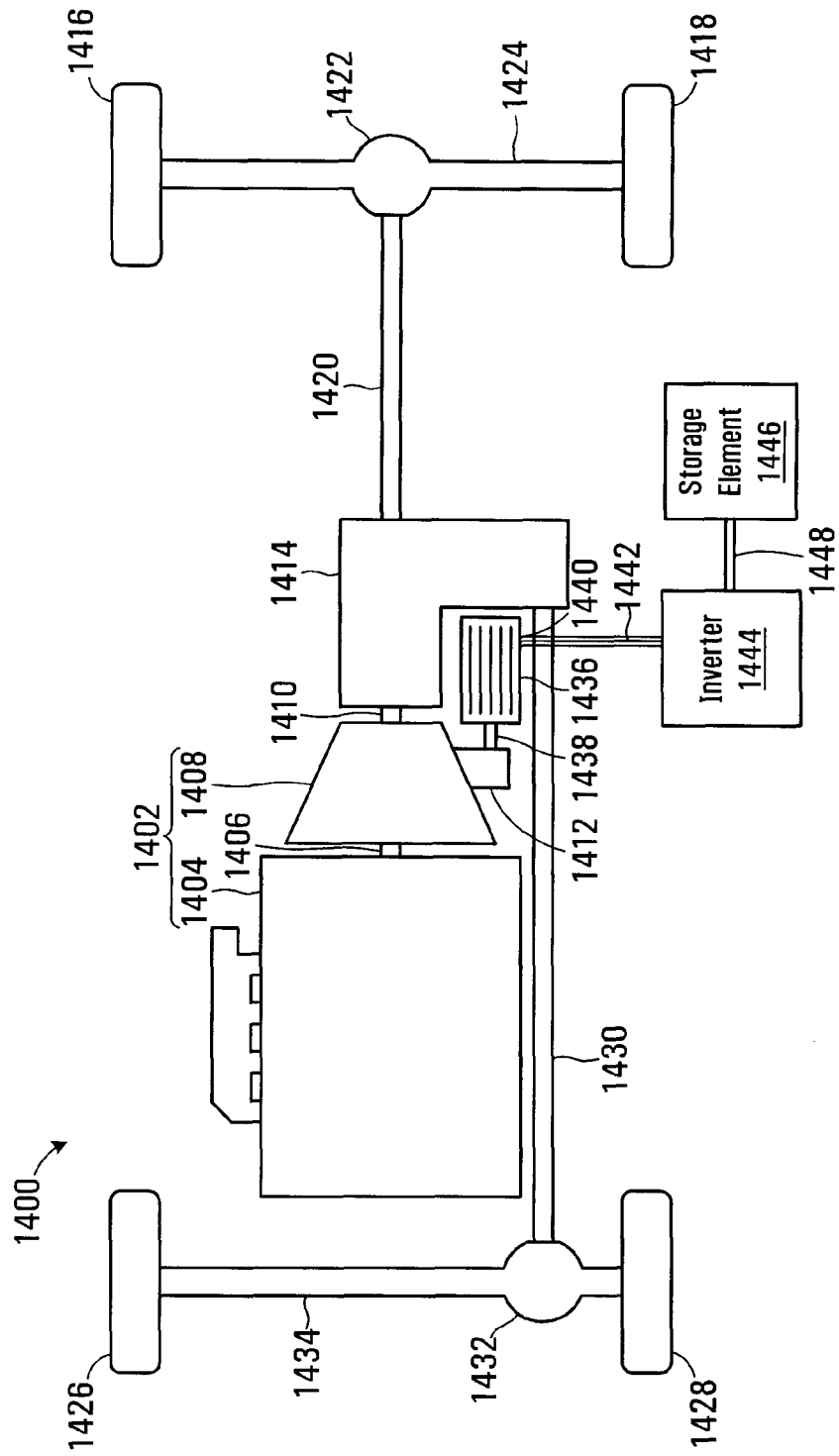
FIG. 14 is a schematic view of a hybrid vehicle, including a gearbox and motor apparatus according to an alternative embodiment of the invention.

An alternative vehicle embodiment is shown generally at 1400 in FIG. 14. Referring to FIG. 14, the vehicle 1400 includes a powertrain 1402, including an engine 1404, such as an internal combustion engine capable of producing torque at an engine output shaft 1406. The powertrain 1402 also includes a transmission 1408, coupled to the engine output shaft 1406. The transmission 1408 includes an output shaft 1410 and a PTO 1412.

The vehicle 1400 also includes a transfer case 1414, coupled to the output shaft 1410 of the transmission 1408. The transfer case 1414 is operable to provide drive power to a rear pair of wheels 1416, 1418 via a driveline shaft 1420, differential 1422 and axle 1424. The transfer case 1414 is also operable to selectively provide drive to a front pair of wheels 1426, 1428 via a drive shaft 1430, differential 1432, and axle 1434.

The vehicle 1400 further includes a motor 1436 coupled via a shaft 1438 to the PTO 1412. In this embodiment, the motor 1436 includes a power input 1440 for receiving an AC operating current from an AC power bus 1442, although in other embodiments the motor could be implemented as a DC motor. The vehicle further includes an inverter 1444 and an energy storage element 1446, connected through a DC power bus 1448.

In one embodiment the transmission configuration 1300 shown in FIG. 13 may be implemented as the transmission 1408, including the hydraulic fluid input/output port 1330, solenoid actuated valve 1332, and hydraulic fluid accumulator 1334. The motor 1436 is operable to provide a starting torque via the PTO 1412, which is coupled through the transmission 1408 as described above in connection with FIG. 13. Additionally, the motor 1436 may be used to provide a drive torque for the vehicle through the PTO 1412, and may further be configured to receive engine torque or regenerative torque from the wheels for charging the storage element 1446.

In other embodiments, the transmission configuration 106 shown in FIG. 2 may be implemented as the transmission 1408, in which case the hydraulic fluid accumulator 1334 would only be required to provide hydraulic fluid pressure for actuating the PTO clutch 244 (shown in FIG. 2). In such an embodiment, the solenoid actuated valve 1332 may be omitted and the check valve 1333 may be moved to between the hydraulic fluid input/output port 1330 and the branch in the hydraulic lines to the solenoid actuated valve 1338. In this case the hydraulic fluid accumulator 1334 accumulates fluid pressure while the fluid pump 1304 is operating, which is subsequently available for operating the solenoid actuated valve 1338 to engage the PTO clutch 1324.

Advantageously, the embodiment shown in FIG. 14 may be implemented on a vehicle having a conventional internal combustion engine drive with relatively minor reconfiguration of the vehicle chassis layout. The conventional 12V DC starter may be omitted in favor of the motor 1436, which provides starting torque, drive torque, and electrical generator functions. Typical light commercial and industrial vehicle configurations provide limited additional space for accommodating an in-line motor. However in many cases reasonable access in the region of the PTO output is provided, and the motor may be conveniently mounted generally as shown in FIG. 14.

The various embodiments of the apparatus described above also facilitate conversion of conventional vehicles having a PTO output to provide hybrid vehicle operating features. The use of the PTO output on the transmission of a conventional engine/transmission also facilitates both a stationary engine start and a moving engine start, while also eliminating the need for a separate starter motor.

What is claimed is:

1. An apparatus for delivering power to a hybrid vehicle comprising:
   a powertrain comprising:
      an engine;
      a transmission coupled to the engine, the transmission comprising a torque converter;
   an electric motor coupleable to the powertrain, the motor being operable to generate a starting torque; and
   a power take-off for transmitting the starting torque through and bypassing the torque converter for starting the engine.

2. The apparatus of claim 1 wherein the torque converter comprises an input operable to receive torque generated by the engine.

3. The apparatus of claim 2 wherein:
   the torque converter is operable to transmit the torque generated by the engine to a torque converter output via fluid coupling;
   the power take-off is operable to transmit the starting torque to the torque converter output; and
   the torque converter further comprises a lock-up clutch for mechanically coupling the torque converter input to the torque converter output for bypassing the torque converter to the engine when transmitting the starting torque.

4. The apparatus of claim 3 wherein the lock-up clutch is actuated by hydraulic fluid pressure provided by a fluid pump operated using engine power and further comprising one of:
   a hydraulic accumulator operably configured to provide hydraulic fluid pressure for actuating the lock-up clutch prior to starting the engine; and
   an electrically powered hydraulic pump operably configured to provide hydraulic fluid pressure for actuating the lock-up clutch prior to starting the engine.

5. The apparatus of claim 1 wherein the power take-off comprises a power take-off clutch operable when engaged to transmit the starting torque through the power take-off to the engine.

6. The apparatus of claim 5 wherein the power take-off clutch is actuated by hydraulic fluid pressure provided by a fluid pump, and further comprising one of:
   a hydraulic accumulator operably configured to provide hydraulic fluid pressure for actuating the power take-off clutch prior to starting the engine; and
   an electrically powered hydraulic pump operably configured to provide hydraulic fluid pressure for actuating the power take-off clutch prior to starting the engine.

7. The apparatus of claim 5 wherein the power take-off clutch comprises one of:
   an electrically actuated clutch; and
   a mechanically actuated clutch wherein power for actuation of the clutch is provided from a power source other than the engine.

8. The apparatus of claim 1 further comprising:
   a planetary gear system operable to receive torque generated by the motor and being selectively configurable to transmit the starting torque through the power take-off to the engine.

9. The apparatus of claim 8 further comprising:
   a clutch disposed to selectively transmit torque between the engine and a driveline of the vehicle, the clutch being operable to transmit an engine drive torque to the driveline when engaged and operable to disengage the engine from the driveline while the engine is being started.

10. The apparatus of claim 9 wherein the clutch comprises an overrunning clutch operable to disengage the driveline from the engine when a rotational speed of the driveline is greater than a rotational speed of the engine.

11. The apparatus of claim 10 wherein the transmission comprises a planetary gear set and wherein the overrunning clutch is coupled between the planetary gear set and the driveline.

12. The apparatus of claim 10 further comprising an auxiliary power output for delivering power for operating auxiliary equipment and wherein the planetary gear system is selectively configurable to transmit the torque generated by the motor to the auxiliary power output.

13. The apparatus of claim 12 wherein the planetary gear system comprises a sun gear, a ring gear, a planet gear coupled between the sun gear and the ring gear, and a planet carrier coupled to the planet gear, and wherein:
   the motor is coupled to the sun gear, and one of the ring gear and the planet carrier is coupled to the auxiliary power output; and
   the planetary gear system is selectively configurable to transmit the torque generated by the motor to the auxiliary power output by configuring the planetary gear system to transmit torque through the one of the ring gear and the planet carrier coupled to the auxiliary power output while prohibiting rotation of the other of the ring gear and the planet carrier.

14. The apparatus of claim 9 wherein the planetary gear system comprises a sun gear, a ring gear, a planet gear coupled between the sun gear and the ring gear, and a planet carrier coupled to the planet gear, wherein:
   the motor is coupled to the sun gear, one of the ring gear and the planet carrier is coupled to the power take-off, and the other of the ring gear and the planet carrier is coupled to the driveline; and
   the planetary gear system is configurable to transmit the starting torque to the engine through one of the ring gear and the planet carrier while prohibiting rotation of the other of the ring gear and the planet carrier.

15. The apparatus of claim 14 further comprising a brake operable to be actuated to prohibit rotation of the other of the ring gear and the planet carrier.

16. The apparatus of claim 15 wherein the clutch comprises a three-way clutch having a disengaged state, an engaged state to transmit torque between the engine and the driveline, and a braked state to prohibit rotation of the driveline.

17. The apparatus of claim 14 wherein the transmission further comprises a transmission lock-up operable to prohibit rotation of an output shaft of the transmission and operably configured to be engaged to prohibit rotation of the other of the ring gear and the planet carrier.

18. The apparatus of claim 14 wherein the ring gear further comprises a ring gear brake operable to prohibit rotation of the ring gear.

19. The apparatus of claim 9 wherein the planetary gear system is selectively configurable to receive torque from the driveline and to transmit a generating torque to the motor when the motor is configured to act as a generator.

20. The apparatus of claim 19 wherein the generating torque comprises at least one of:
    a torque generated by the engine; and
    a regenerative torque coupled through wheels of the vehicle to the driveline.

21. The apparatus of claim 19 wherein the planetary gear system comprises a sun gear, a ring gear, a planet gear coupled between the sun gear and the ring gear, and a planet carrier coupled to the planet gear, wherein:
    the motor is coupled to the sun gear, and one of the ring gear and the planet carrier is coupled to the driveline; and
    the planetary gear system is configurable to transmit the generating torque by prohibiting rotation of the other of the ring gear and the planet carrier to cause the generating torque to be transmitted from the driveline through the sun gear to the motor.

22. The apparatus of claim 9 wherein the planetary gear system is selectively configurable to transmit a portion of the torque generated by the motor to the driveline as a motor drive torque.

23. The apparatus of claim 22 wherein the planetary gear system is selectively configurable to transmit the motor drive torque to the driveline while simultaneously transmitting the starting torque through the power take-off to the engine for starting the engine.

24. The apparatus of claim 23 wherein the planetary gear system comprises a sun gear, a ring gear, a planet gear coupled between the sun gear and the ring gear, and a planet carrier coupled to the planet gear, and wherein:
    the motor is coupled to the sun gear, one of the ring gear and the planet carrier is coupled to the power take-off, and the other of the ring gear and the planet carrier is coupled to the driveline; and
    the planetary gear system is configurable to permit rotation of both the ring gear and the planet carrier.

25. The apparatus of claim 8 further comprising an auxiliary power output for delivering power for operating auxiliary equipment, and wherein the power take-off is operable to be selectively coupled to transmit torque to the auxiliary power output once the engine has started.

26. A method for delivering power in a hybrid vehicle comprising:
    causing an electric motor to generate a starting torque; and
    coupling the electric motor to a powertrain, the power train comprising an engine and a transmission; and
    transmitting at least a portion of the starting torque through a power take-off for starting the engine, wherein the starting torque bypasses a torque converter of the transmission.

27. The method of claim 26 wherein transmitting the portion of the starting torque through the power take-off comprises engaging a power take-off clutch.

28. The method of claim 27 wherein the power take-off clutch is actuated by hydraulic fluid pressure provided by a fluid pump, and further comprising one of:
    accumulating hydraulic fluid pressure for actuating the power take-off clutch prior to starting the engine; and
    actuating an electrically powered hydraulic pump operably configured to provide hydraulic fluid pressure for actuating the power take-off clutch prior to starting the engine.

29. The method of claim 26 further comprising:
    receiving a torque from a driveline of the vehicle; and
    transmitting a generating torque to the electric motor.

30. The method of claim 29 wherein transmitting the generating torque comprises transmitting at least one of:
    a torque generated by the engine; and
    a regenerative torque coupled through wheels of the vehicle to the driveline.

31. The method of claim 26 further comprising:
    receiving torque generated by the electric motor; and
    transmitting the torque to an auxiliary power output.

32. An apparatus for transmitting a starting torque to a power-take off of a vehicle powertrain comprising:
    a power take-off clutch;
    an electric motor coupled to the power take-off clutch, the electric motor operable to generate the starting torque; and
    an actuator operable to engage the power take-off clutch to transmit the starting torque through the power take-off to an engine, wherein transmitting the starting torque through the power take-off bypasses a torque converter within a transmission of the powertrain.

33. The apparatus of claim 32 wherein the clutch is actuated by hydraulic fluid pressure and further comprising one of:
    a hydraulic accumulator operably configured to provide hydraulic fluid pressure for actuating the clutch prior to starting the engine; and
    an electrically powered hydraulic pump operably configured to provide hydraulic fluid pressure for actuating the clutch prior to starting the engine.

34. The apparatus of claim 32 wherein the electric motor is further operable to transmit a portion of the torque generated by the motor to a driveline as a motor drive torque.

* * * * *